(12) United States Patent
DiSalvo et al.

(10) Patent No.: US 6,717,782 B2
(45) Date of Patent: Apr. 6, 2004

(54) CIRCUIT BREAKER WITH INDEPENDENT TRIP AND RESET LOCKOUT

(75) Inventors: Nicholas L. DiSalvo, Levittown, NY (US); William R. Ziegler, East Northport, NY (US); Frantz Germain, Rosedale, NY (US); David Herzfeld, Huntington, NY (US); Stephen Stewart, Uniondale, NY (US); Roger M. Bradley, North Belmore, NY (US)

(73) Assignee: Leviton Manufacturing Co., Inc., Little Neck, NY (US)

( * ) Notice: Subject to any disclaimer, the term of this patent is extended or adjusted under 35 U.S.C. 154(b) by 0 days.

(21) Appl. No.: 09/950,733

(22) Filed: Sep. 12, 2001

(65) Prior Publication Data

US 2002/0006022 A1 Jan. 17, 2002

Related U.S. Application Data

(63) Continuation of application No. 09/379,140, filed on Aug. 20, 1999, now Pat. No. 6,288,882, which is a continuation-in-part of application No. 09/369,759, filed on Aug. 6, 1999, now Pat. No. 6,282,070, which is a continuation-in-part of application No. 09/138,955, filed on Aug. 24, 1998, now Pat. No. 6,040,967.

(51) Int. Cl.[7] ................................................. H02H 3/00
(52) U.S. Cl. ........................................................ 361/42
(58) Field of Search ........................ 361/42–50; 335/18, 335/21, 24, 26, 202

(56) References Cited

U.S. PATENT DOCUMENTS

| | | | | |
|---|---|---|---|---|
| 4,034,266 A | * | 7/1977 | Virani et al. | 361/42 |
| 4,595,894 A | * | 6/1986 | Doyle et al. | 335/18 |
| 4,719,437 A | * | 1/1988 | Yun | 335/18 |
| 4,802,052 A | * | 1/1989 | Brant et al. | 361/42 |
| 4,851,951 A | * | 7/1989 | Foster, Jr. | 361/50 |
| 5,223,810 A | * | 6/1993 | Van Haaren | 335/18 |
| 5,224,006 A | * | 6/1993 | MacKenzie et al. | 361/45 |
| 5,594,398 A | * | 1/1997 | Marcou et al. | 335/18 |
| 5,600,524 A | * | 2/1997 | Neiger et al. | 361/42 |
| 5,805,397 A | * | 9/1998 | MacKenzie | 361/42 |
| 6,040,967 A | * | 3/2000 | DiSalvo | 361/42 |
| 6,246,558 B1 | * | 6/2001 | DiSalvo et al. | 361/42 |
| 6,282,070 B1 | * | 8/2001 | Ziegler et al. | 361/42 |
| 6,288,882 B1 | * | 9/2001 | DiSalvo et al. | 361/42 |
| 6,437,953 B2 | * | 8/2002 | DiSalvo et al. | 361/42 |

* cited by examiner

Primary Examiner—Ronald W. Leja
(74) Attorney, Agent, or Firm—Paul J. Sutton

(57) ABSTRACT

Resettable circuit breakers having an independent trip mechanism and a reset lockout are provided. The trip mechanism operates independently of the fault protection operations, and the reset lockout prevents the resetting of the circuit breaker if the fault protection is non-operational or if an open neutral condition exists.

47 Claims, 32 Drawing Sheets

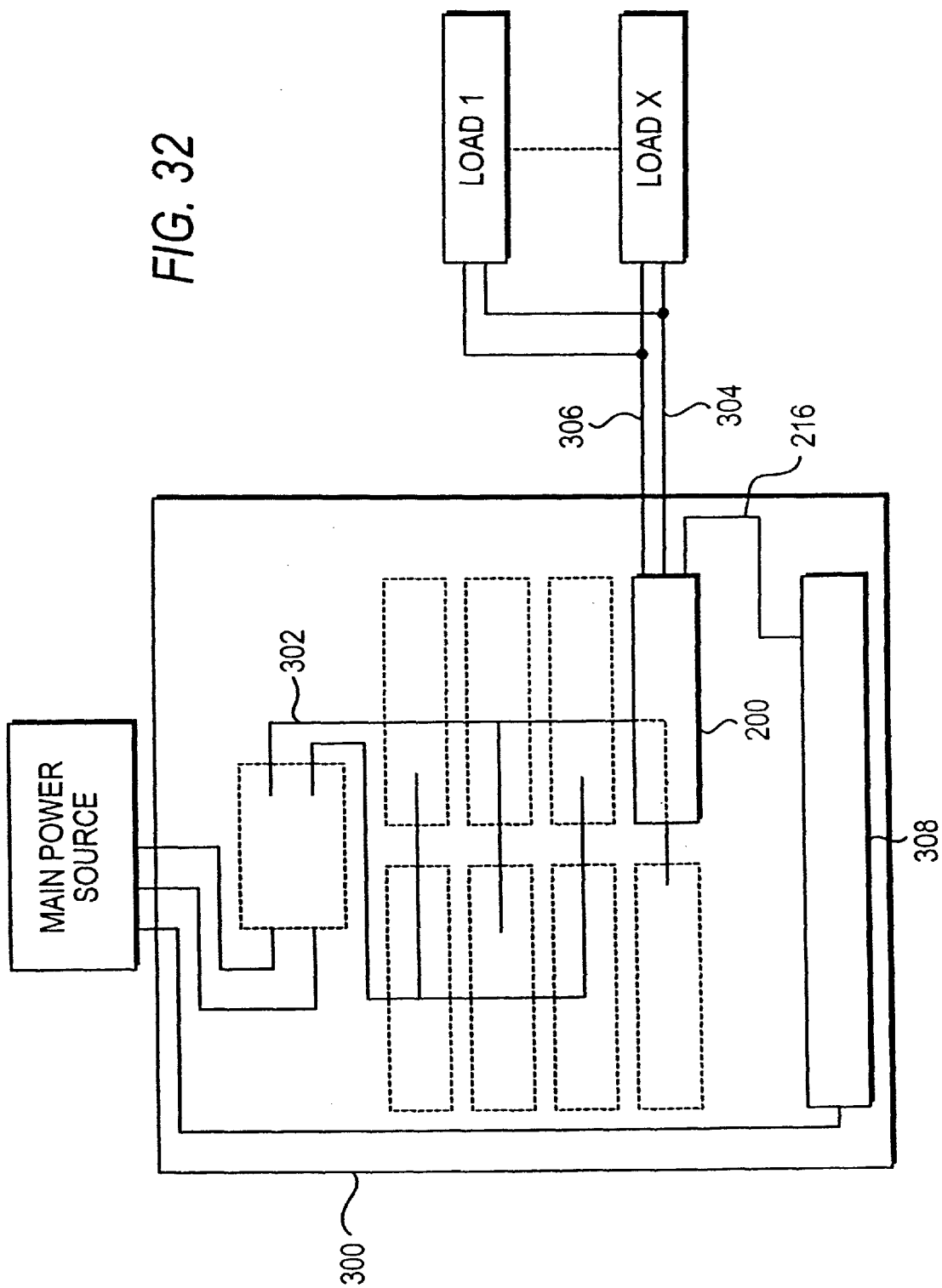

CIRCUIT BREAKER WITH INDEPENDENT TRIP AND RESET LOCKOUT

CROSS REFERENCE TO RELATED APPLICATIONS

This application is a continuation of application Ser. No. 09/379,140 filed Aug. 20, 1999, which issued on Sep. 11, 2001 as U.S. Pat. No. 6,288,882 which is a continuation-in-part of Ser. No. 09/369,759, filed Aug. 6, 1999, now U.S. Pat. No. 6,282,070 which is a continuation-in-part of application Ser. No. 09/138,955, filed Aug. 24, 1998, which issued on Mar. 21, 2000 as U.S. Pat. No. 6,040,967 all of which are incorporated herein in their entirety by reference.

BACKGROUND

1. Field

The present application relates to a family of resettable circuit breakers that include a reset lockout operation and optionally an independent trip operation, and to power distribution systems in which such circuit breakers are utilized. More particularly, the present application is directed to circuit breakers that include a reset lock out capable of preventing the circuit breaker from resetting if a circuit interrupting portion used for fault protection is not functioning properly and/or if an open neutral condition exists. In addition, a trip portion may be added to the circuit breaker to permit the breaker to be tripped independent of the operation of the circuit interrupting portion.

2. Description of the Related Art

The electrical wiring device industry has witnessed an increasing call for circuit interrupting devices or systems which are designed to interrupt power to various loads, such as household appliances, consumer electrical products and branch circuits. In particular, electrical codes require electrical circuits in home bathrooms and kitchens to be equipped with ground fault circuit protection. Presently available GFCI devices, such as the GFCI receptacle described in commonly owned U.S. Pat. No. 4,595,894, use an electrically activated trip mechanism to mechanically break an electrical connection between one or more input and output conductors. Such devices are resettable after they are tripped by, for example, the detection of a ground fault. In the device discussed in the '894 patent, the trip mechanism used to cause the mechanical breaking of the circuit (i.e., the connection between input and output conductors) includes a solenoid (or trip coil). A test button is used to test the trip mechanism and circuitry used to sense faults, and a reset button is used to reset the electrical connection between input and output conductors.

However, instances may arise where an abnormal condition, caused by for example a lightning strike, occurs which may result not only in a surge of electricity at the device and a tripping of the device but also a disabling of the trip mechanism used to cause the breaking of the circuit. This may occur without the knowledge of the user. Under such circumstances, an unknowing user faced with a GFCI which has tripped may press the reset button which, in turn, will cause the device with an inoperative trip mechanism to reset without the ground fault protection available.

Further, an open neutral condition, which is defined in Underwriters Laboratories (UL) Standard PAG 943A, may exist with the electrical wires supplying electrical power to such GFCI devices. If an open neutral condition exists with the neutral wire on the line (versus load) side of the GFCI device, an instance may arise where a current path is created from the phase (or hot) wire supplying power to the GFCI device through the load side of the device and a person to ground. In the event that an open neutral condition exists, current GFCI devices which have tripped, may be reset even though the open neutral condition may remain.

Commonly owned application Ser. No. 09/138,955, filed Aug. 24, 1998, which is incorporated herein in its entirety by reference, describes a family of resettable circuit interrupting devices capable of locking out the reset portion of the device if the circuit interrupting portion is non-operational or if an open neutral condition exists. Commonly owned application Ser. No. 09/175,228, filed Oct. 20, 1998, which is incorporated herein in its entirety by reference, describes a family of resettable circuit interrupting devices capable of locking out the reset portion of the device if the circuit interrupting portion is non-operational or if an open neutral condition exists and capable of breaking electrical conductive paths independent of the operation of the circuit interrupting portion.

Current resettable circuit breakers with fault protection capabilities, such as the HOM-GFI series of GFCI circuit breakers manufactured by Square-D Company, Palatine, Ill., have line and load power and neutral connections and a switch for controlling power distribution to a load. To provide fault protection, such circuit breakers have sense circuitry and linkage to the switch, which are capable of sensing faults (e.g., ground faults) between the load power and the line neutral conductors and opening the switch. A test button accessible from an exterior of the breaker is used to test the operation of the fault protection portion of the breaker when depressed. However, like conventional resettable receptacles, conventional resettable circuit breakers do not include either a reset lockout or an independent trip portion.

SUMMARY

The present application relates to a family of resettable circuit breakers having fault protection capabilities. The circuit breakers according to the present application include a circuit interrupting portion, a reset portion and a reset lockout portion. The circuit breakers may also include an independent trip portion. The reset lockout portion inhibits the resetting of the circuit breaker if the circuit interrupting portion is non-operational or if an open neutral condition exists. The trip portion operates independently of the circuit interrupting portion and facilitates tripping of the circuit breaker whether or not the circuit interrupting portion is operating properly.

In one embodiment, a GFCI circuit breaker having a housing, a circuit interrupting portion, a reset portion and a reset lockout portion is provided. Preferably, the housing has line phase and load phase connections that are accessible from an exterior of the housing and a conductive path within the housing between the line and load phase connections. The circuit interrupting portion is disposed within the housing and is configured to open the conductive path upon the occurrence of a ground fault. Examples of faults contemplated include ground faults, arc faults, immersion detection faults, appliance leakage faults and equipment leakage faults. The reset portion includes an actuator that is also accessible from the exterior of the housing, and is configured to close the conductive path upon actuation. Preferably, the reset lockout portion inhibits the closing of the conductive path if the circuit interrupting portion is non-operational or if an open neutral condition exists. The reset lockout portion may be an active type lockout that prevents the resetting of the conductive path, or a passive type lockout whose characteristics inherently inhibit the resetting of the conductive path.

The circuit breaker may optionally include a trip portion disposed at least partially within the housing. The trip portion is configured to open the conductive path independently of the operation of the circuit interrupting portion. Thus, in this configuration, if the circuit interrupting portion is not operating properly, the circuit breaker can still be tripped but it cannot be reset, since the reset operation utilizes the circuit interrupting portion when resetting the breaker.

The present application also provides a method for testing the operation of a circuit breaker having a housing with line and load phase connections accessible from an exterior surface of the housing, and a conductive path between the line and load phase connections. The method includes the steps of: 1) manually activating a trip portion of the circuit breaker to open the conductive path and to enable a reset lockout portion that inhibits closing the conductive path; and 2) activating a reset portion to perform a reset operation. During the reset operation a circuit interrupting portion is activated, and if the circuit interrupting portion is operational the circuit interrupting portion disables the reset lockout portion and facilitates closing of the conductive path. If, however, the circuit interrupting portion is not operating properly, the reset lockout portion remains enabled so that closing the conductive path is inhibited.

The present application also provides a circuit interrupting system that includes a source of power, a circuit breaker, having for example the above described independent trip and reset lockout portions, connected to the source of power, and at least one load connected to the circuit breaker.

BRIEF DESCRIPTION OF THE DRAWINGS

Preferred embodiments of the present application are described herein with reference to the drawings in which similar elements are given similar reference characters, wherein:

FIG. 32 is a block diagram of an exemplary circuit interrupting system for home power distribution system incorporating a GFCI circuit breaker having a reset lockout operation according to the present application.

DETAILED DESCRIPTION

Resettable Circuit Interrupting Devices

Figure 1:
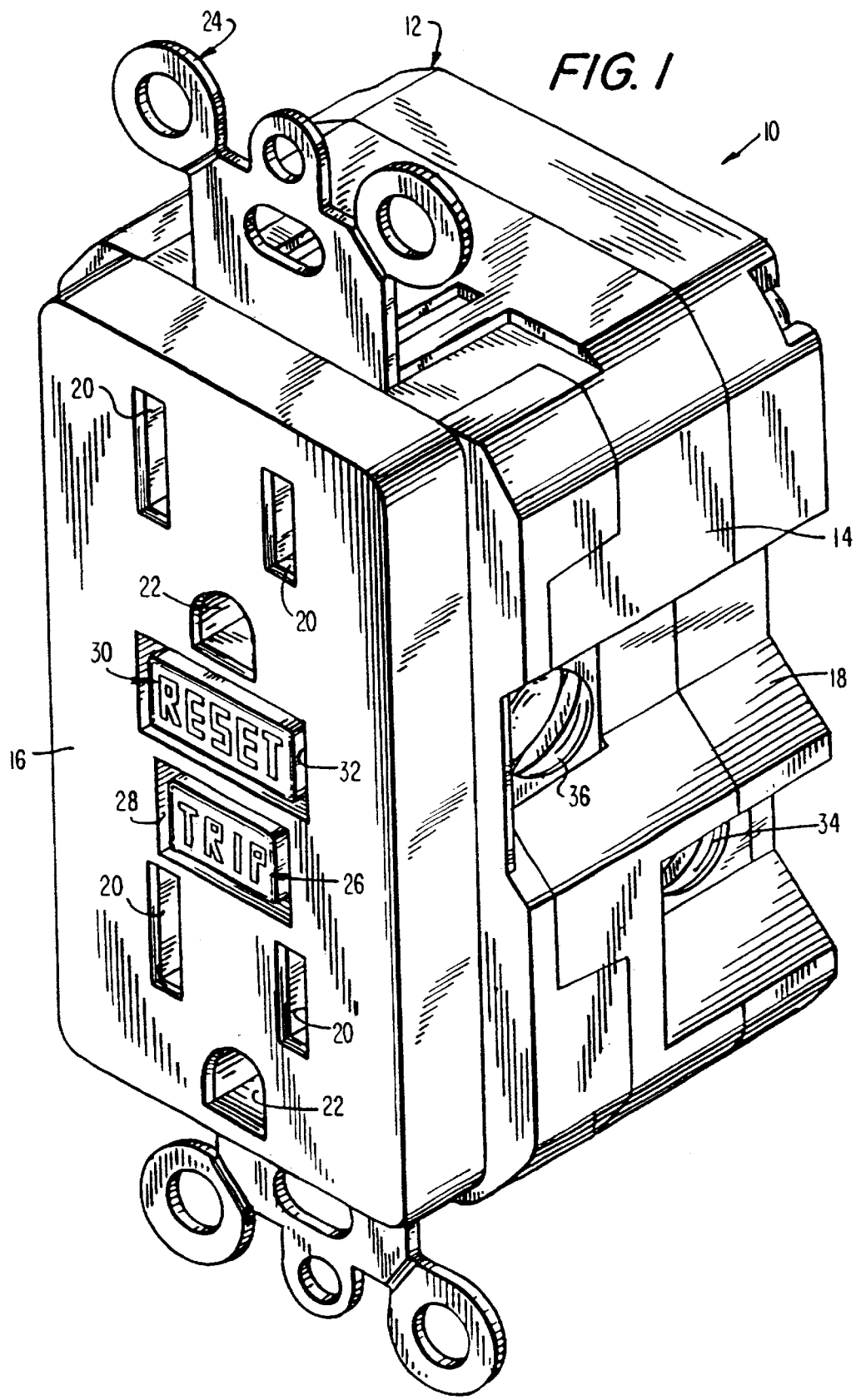
FIG. 1 is a perspective view of an exemplary ground fault circuit interrupting device according to the present application.

The present application relates to a family of resettable circuit interrupting devices for breaking and making electrical connections between input and output conductive paths associated with the devices and to systems incorporating such devices. The family of devices include: ground fault circuit interrupters (GFCI's), arc fault circuit interrupters (AFCI's), immersion detection circuit interrupters (IDCI's), appliance leakage circuit interrupters (ALCI's) and equipment leakage circuit interrupters (ELCI's). Generally, each circuit interrupting device according to the present application has a circuit interrupting portion, a reset portion and reset lockout portion, and an optional trip portion, which will be described in more detail below.

The circuit interrupting and reset portions preferably use electromechanical components to break and make the conductive path between input and output conductors. More particularly, the circuit interrupting portion is used to break electrical continuity between input and output conductive paths (or conductors) upon the detection of a fault. Operation of the reset and reset lockout portions is in conjunction with the operation of the circuit interrupting portion, so that the electrical connection between conductive paths cannot be reset if the circuit interrupting portion is non-operational and/or if an open neutral condition exists.

The trip portion preferably operates independently of the circuit interrupting portion so that in the event the circuit interrupting portion becomes non-operational the device can still be tripped. Preferably, the trip portion is manually activated and uses mechanical components to break the electrical connections. However, the trip portion may use electrical circuitry and/or electromechanical components to break the electrical connections.

For the purpose of the present application, the structure or mechanisms, used in the circuit interrupting devices, shown in the drawings and described hereinbelow are incorporated into GFCI receptacles suitable for installation in a single-gang junction box in a home, and GFCI circuit breakers suitable for installation in a circuit breaker panel. However, the mechanisms according to the present application can be included in any of the various devices in the family of resettable circuit interrupting devices.

Turning now to FIG. 1, an exemplary GFCI receptacle is shown. The GFCI receptacle 10 has a housing 12 consisting of a relatively central body 14 to which a face or cover portion 16 and a rear portion 18 are removably secured. The face portion 16 has entry ports 20 for receiving normal or polarized prongs of a male plug of the type normally found at the end of a lamp or appliance cord set (not shown), as well as ground-prong-receiving openings 22 to accommodate a three-wire plug. The receptacle also includes a mounting strap 24 used to fasten the receptacle to a junction box.

A trip actuator 26, preferably a button, which is part of the trip portion to be described in more detail below, extends through opening 28 in the face portion 16 of the housing 12. The trip actuator is used, in this exemplary embodiment, to mechanically trip the GFCI receptacle, i.e., break the electrical connection between input and output conductive paths, independent of the operation of the circuit interrupting portion.

A reset actuator 30, preferably a button, which is part of the reset portion, extends through opening 32 in the face portion 16 of the housing 12. The reset button is used to activate the reset operation, which re-establishes electrical continuity between the input and output conductive paths, i.e., resets the device, if the circuit interrupting portion is operational.

Electrical connections to existing household electrical wiring are made via binding screws 34 and 36, where screw 34 is an input (or line) connection point and screw 36 is an output (or load) connection point. It should be noted that two additional binding screws (not shown) are located on the opposite side of the receptacle 10. Similar to binding screws 34 and 36, these additional binding screws provide input and output connection points. Further, the input connections are for line side phase (hot) and neutral conductors of the household wiring, and the output connections are for load side phase (hot) and neutral conductors of the household wiring. The plug connections are also considered output conductors. A more detailed description of a GFCI receptacle is provided in U.S. Pat. No. 4,595,894 which is incorporated herein in its entirety by reference. It should also be noted that binding screws 34 and 36 are exemplary of the types of wiring terminals that can be used to provide the electrical connections. Examples of other types of wiring terminals include set screws, pressure clamps, pressure plates, push-in type connections, pigtails and quick-connect tabs.

Figure 2:
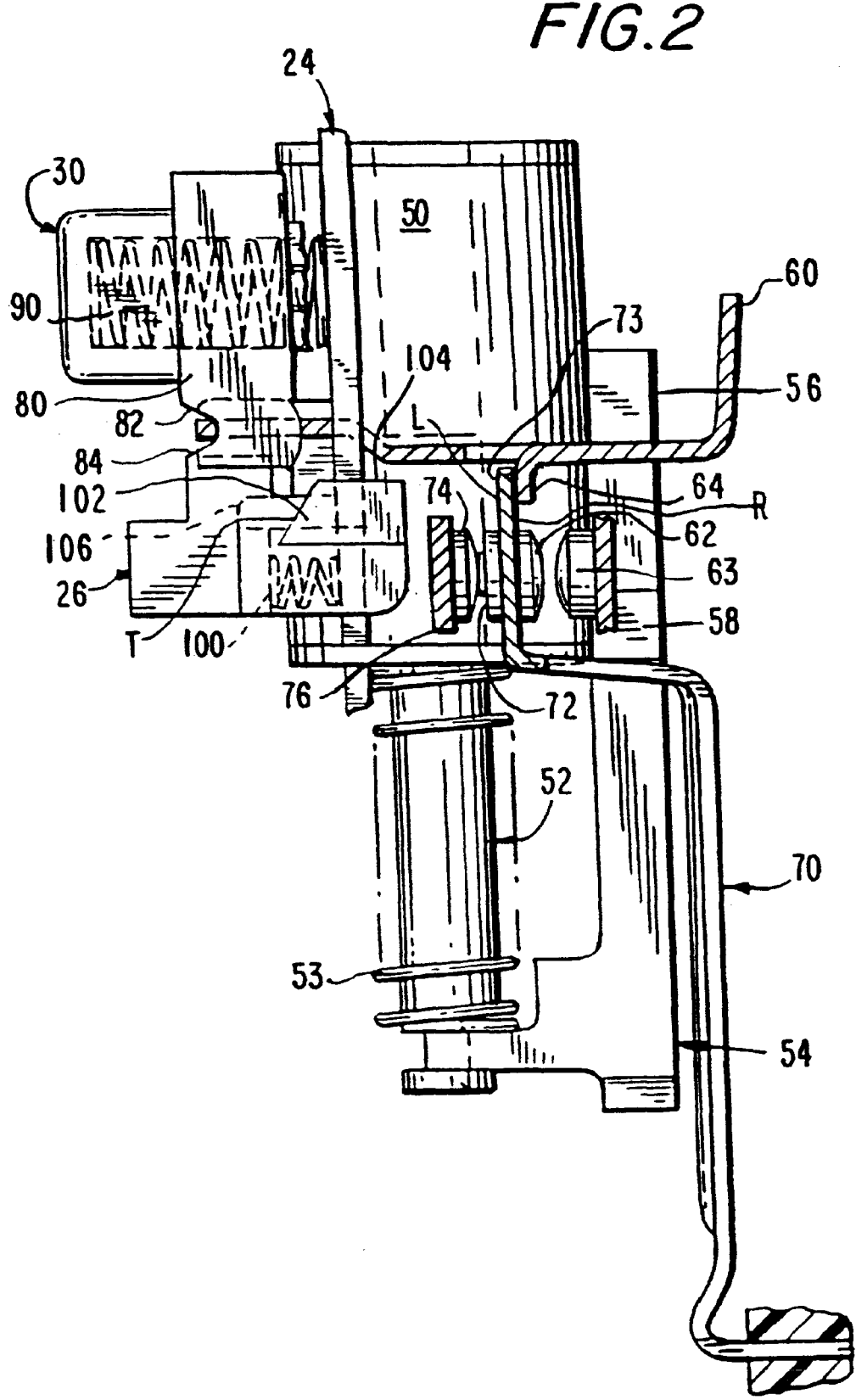
FIG. 2 is side elevational view, partly in section, of components of an independent trip mechanism and a reset mechanism for the GFCI device shown in FIG. 1, illustrating the components when the circuit interrupting device is in a set or circuit making position.

Referring to FIG. 2, the conductive path between the input connection point 34 and the output connection point 36 (or the entry ports 20) includes contact arm 70 which is movable between stressed and unstressed positions, movable contact 72, fixed contact 74 and contact arm 76. A movable latching member 60 and contacts 72 and 74 are used to make and break the conductive path.

There is also shown in FIG. 2, mechanical components used during circuit interrupting and device reset operations according to one embodiment of the present application. Although these components shown in the drawings are electromechanical in nature, the present application also contemplates using semiconductor type circuit interrupting and reset components, as well as other mechanisms capable or making and breaking electrical continuity.

Figure 8:
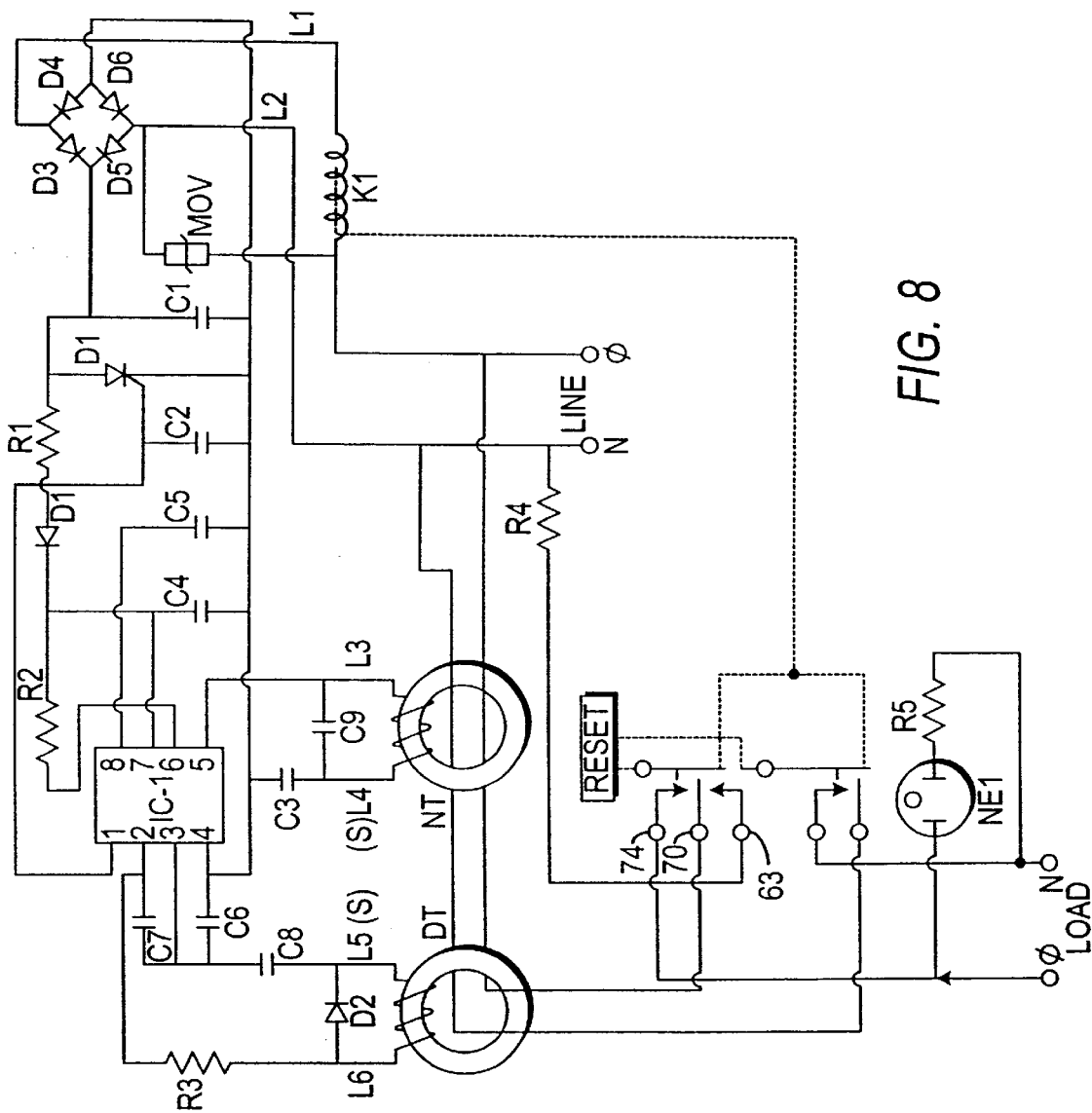
FIG. 8 is a schematic diagram of a circuit for detecting ground faults and resetting the circuit interrupting device of FIG. 1.

The circuit interrupting portion has a circuit interrupter and electronic circuitry capable of sensing faults, e.g., current imbalances, on the hot and/or neutral conductors. In a preferred embodiment for the GFCI receptacle, the circuit interrupter includes a coil assembly 50, a plunger 52 responsive to the energizing and de-energizing of the coil assembly and a banger 54 connected to the plunger 52. The banger 54 has a pair of banger dogs 56 and 58 which interact with movable latching member 60 used to set and reset the connection between input and output conductors. The coil assembly 50 is activated in response to the sensing of a ground fault by, for example, the sense circuitry shown in FIG. 8. FIG. 8 shows conventional circuitry for detecting ground faults that includes a differential transformer that senses current imbalances.

The reset portion includes reset button 30, movable latching member 60 connected to the reset button 30, latching finger 64 and reset contacts 62 and 63 that temporarily activate the circuit interrupting portion when the reset button is depressed. Preferably, the reset contacts 62 and 63 are normally open momentary contacts. The latching finger 64 is used to engage side R of the contact arm 70 and move the arm 70 back to its stressed position where contact 72 touches contact 74.

The movable latching member 60 is, in this embodiment, common to each portion (i.e., the trip, circuit interrupting, reset and reset lockout portions) and used to facilitate making, breaking or locking out of the electrical connections between the input and output conductive paths. However, the circuit interrupting devices according to the present application also contemplate embodiments where there is no common mechanism or member between each portion or between certain portions.

Figure 3:
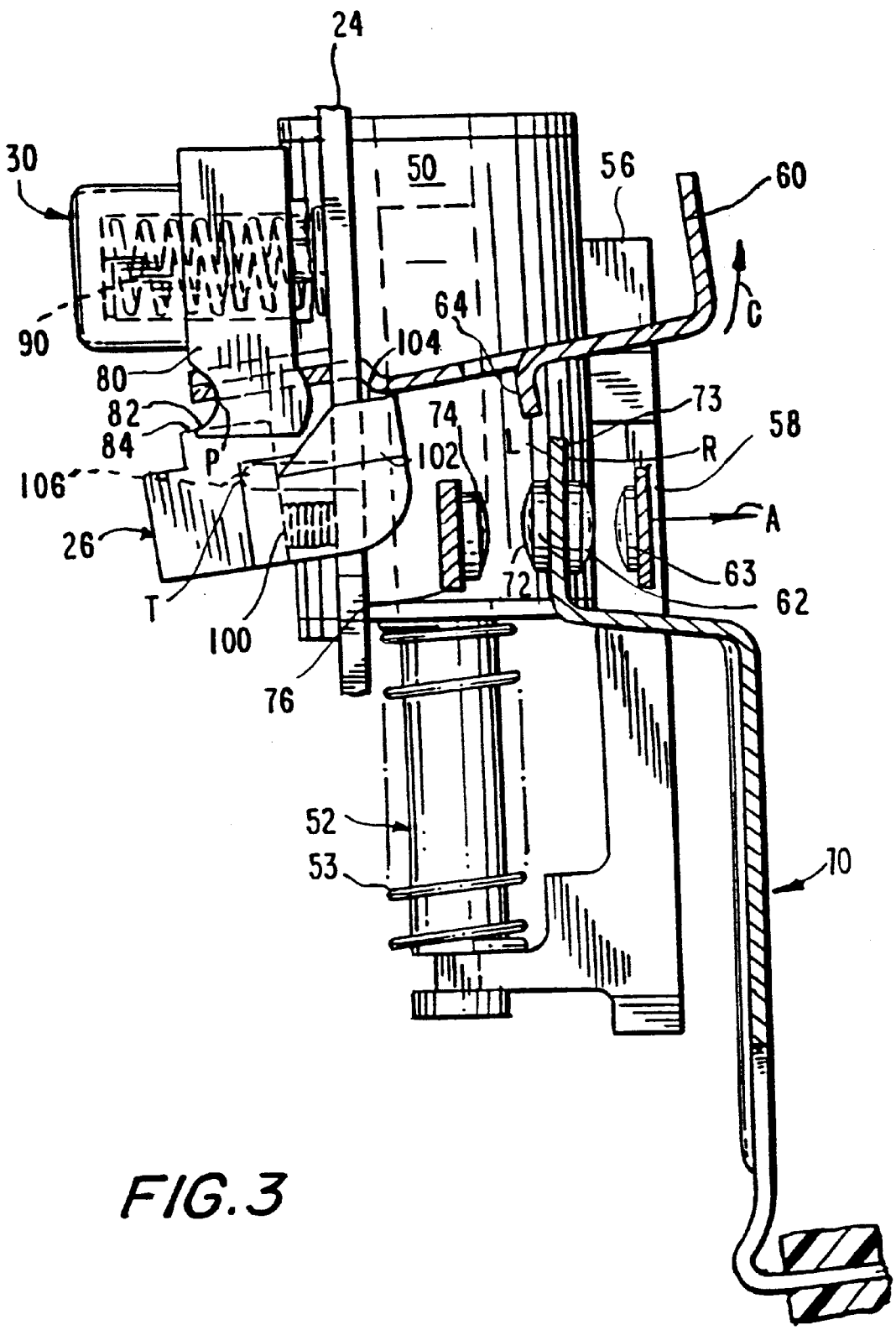
FIG. 3 is a side elevational view similar to FIG. 2, illustrating components of the independent trip mechanism when the circuit interrupting device is in a circuit breaking position.

In the embodiment shown in FIGS. 2 and 3, the reset lockout portion includes latching finger 64 which after the device is tripped, engages side L of the movable arm 70 and blocks the movable arm 70 from moving so that contacts 72 and 74 are prevented from touching. In this embodiment, latching finger 64 acts as an active inhibitor that prevents the contacts from touching. Alternatively, the natural bias of movable arm 70 can be used as a passive inhibitor that prevents contacts 72 and 74 from touching.

Figure 4:
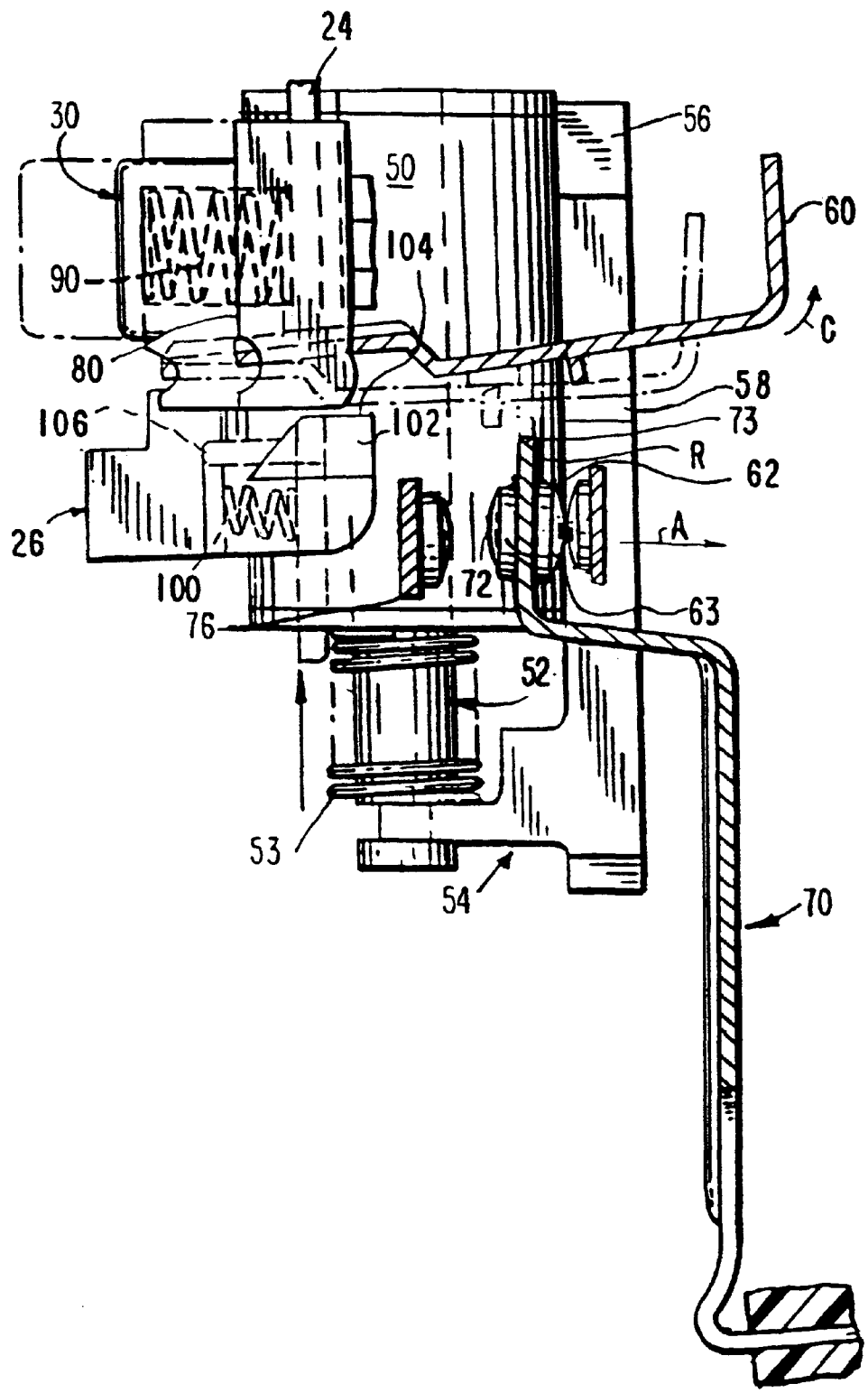
FIG. 4 is a side elevational view similar to FIG. 2, illustrating the components of the reset mechanism during reset operation of the circuit interrupting device.

Referring now to FIGS. 2–4, the mechanical components of the circuit interrupter and reset mechanisms in various stages of operation are shown. In FIG. 2, the GFCI receptacle is shown in a set position where movable contact arm 70 is in a stressed condition so that movable contact 72 is in electrical engagement with fixed contact 74 of contact arm 76. If the sensing circuitry of the GFCI receptacle senses a ground fault, the coil assembly 50 is energized to draw plunger 52 into the coil assembly 50 so that banger 54 moves upwardly. As the banger moves upwardly, the banger front dog 58 strikes the latch member 60 causing it to pivot in a counterclockwise direction C about the joint created by the top edge 82 and inner surface 84 of finger 80. The movement of the latch member 60 removes the latching finger 64 from engagement with side R of the remote end 73 of the movable contact arm 70, and permits contact arm 70 to return to its pre-stressed condition opening contacts 72 and 74, seen in FIG. 3. It should be noted that the description thus far has been in terms of a single latch member 60 and a single contact arm 70. However, there are preferably two sets of latch members 60 and contact arms 70: one set for the phase (or hot) conductors (line and load side); and the other set for the neutral conductors (line and load side). Further, the banger 54 preferably has two sets of banger dogs: one set for the phase conductors (line and load side); and the other set for the neutral conductors (line and load side).

Figure 6:
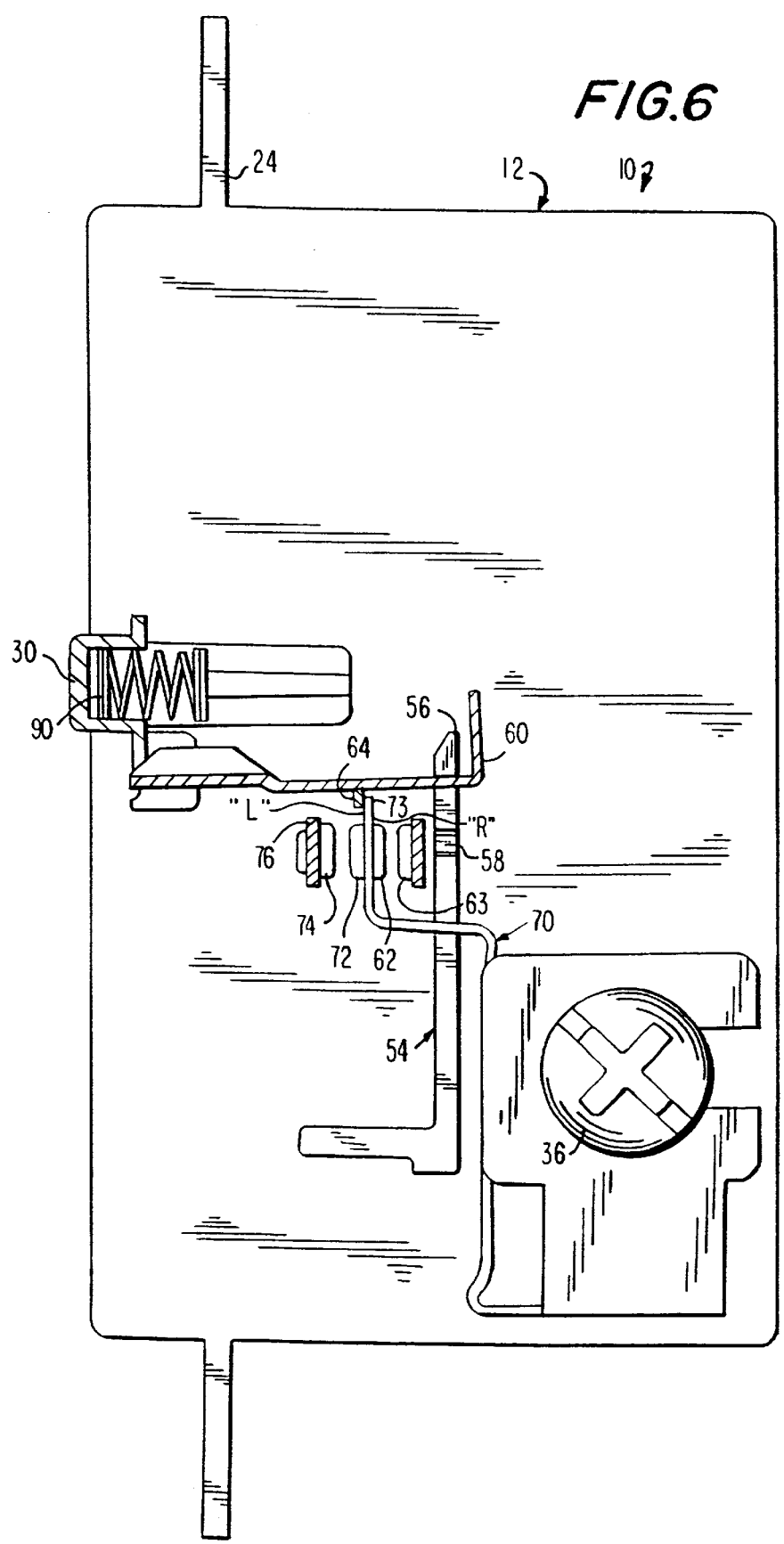

After tripping, the coil assembly 50 is de-energized so that spring 53 returns plunger 52 to its original extended position and banger 54 moves to its original position releasing latch member 60. At this time the latch member 60 is in a lockout position where latch finger 64 inhibits movable contact 72 from engaging fixed contact 74, as seen in FIG. 6. As noted, latching finger 64 acts as an active inhibitor that prevents the contacts from touching. Alternatively, the natural bias of movable arm 70 can be used as a passive inhibitor that prevents contacts 72 and 74 from touching.

Figure 7:
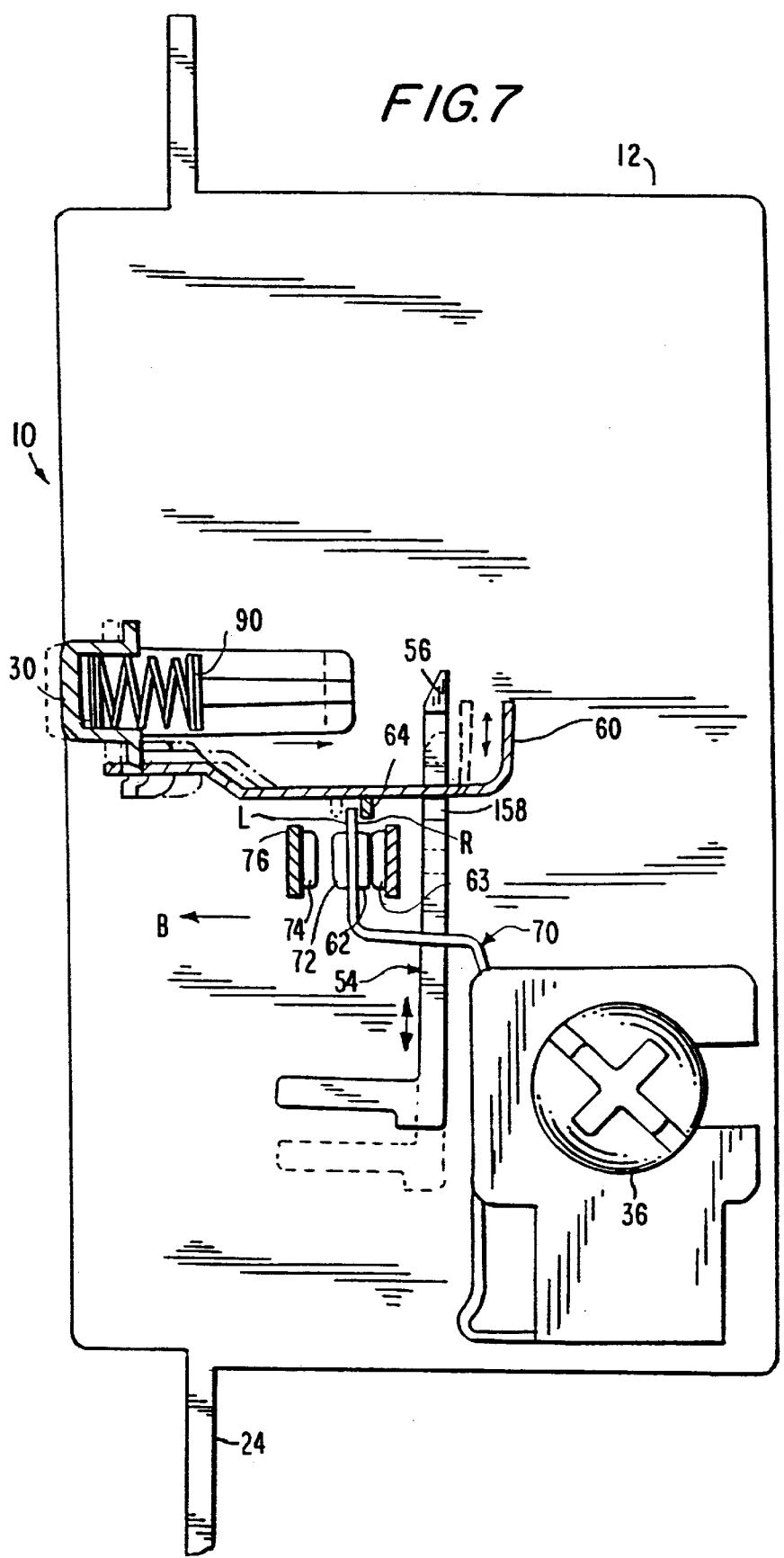

To reset the GFCI receptacle so that contacts 72 and 74 are closed and continuity between the input and output conductors is reestablished, the reset button 30 is depressed sufficiently to overcome the bias force of return spring 90 and move the latch member 60 in the direction of arrow A, seen in FIG. 4. While the reset button 30 is being depressed, latch finger 64 contacts side L of the movable contact arm 70 and continued depression of the reset button 30 forces the latch member to overcome the stress force exerted by the arm 70 causing the reset contact 62 on the arm 70 to close on reset contact 63. Closing the reset contacts activates the operation of the circuit interrupter by, for example simulating a fault, so that plunger 52 moves the banger 54 upwardly so that the banger dog 58 strikes the latch member 60 pivoting the latch member in the direction of arrow C while the latch member 60 continues to move in the direction of arrow A. As a result, the latch finger 64 is lifted over side L of the remote end 73 of the movable contact arm 70 onto side R of the remote end of the movable contact arm, as seen in FIG. 7. Contact arm 70 returns to its unstressed position opening contacts 62 and 63, so as to terminate the activation of the circuit interrupting portion, thereby de-energizing the coil assembly 50.

Figure 5:
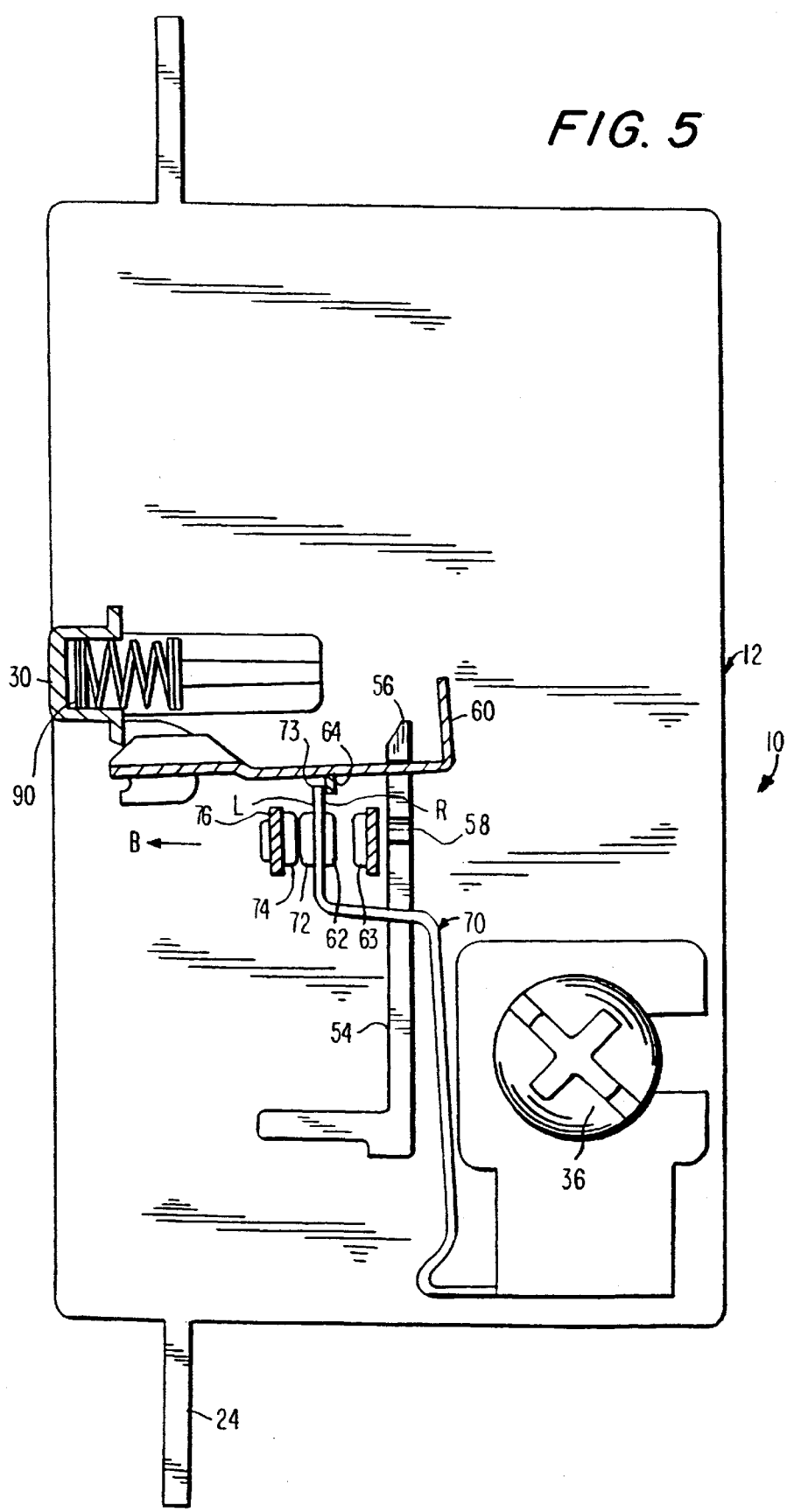
FIGS. 5–7 are schematic representations of one embodiment of the reset mechanism of the present application, illustrating a latching member used to make an electrical connection between input and output conductors and to relate the reset mechanism with the operation of the circuit interrupter.

After the circuit interrupter operation is activated, the coil assembly 50 is de-energized so that so that plunger 52 returns to its original extended position, and banger 54 releases the latch member 60 so that the latch finger 64 is in a reset position, seen in FIG. 5. Release of the reset button causes the latching member 60 and movable contact arm 70 to move in the direction of arrow B until contact 72 electrically engages contact 74.

Referring again to FIGS. 2 and 3 the trip portion according to this embodiment the present application includes a trip actuator 26, preferably a button, that is movable between a set position, where contacts 72 and 74 are permitted to close or make contact, as seen in FIG. 2, and a trip position where contacts 72 and 74 are caused to open, as seen in FIG. 3. Spring 100 normally biases trip button 26 toward the set position. The trip portion also includes a trip arm 102 that extends from the trip button 26 so that a surface 104 of the trip arm 102 moves into contact with the movable latching member 60, when the trip button is moved toward the trip position. When the trip button 26 is in the set position, surface 104 of trip arm 102 can be in contact with or close proximity to the movable latching member 60, as seen in FIG. 2.

In operation, upon depression of the trip button 26, the trip button pivots about point T of pivot arm 106 extending from strap 24 so that the surface 104 of the trip arm 102 can contact the movable latching member 60. As the trip button is moved toward the trip position, trip arm 102 also enters the path of movement of the finger 80 associated with reset button 30 thus blocking the finger 80 from further movement in the direction of arrow A. By blocking the movement of the finger 80, the trip arm 102 inhibits the activation of the reset operation and, thus, inhibits simultaneous activation of the trip and reset operations. Further depression of the trip button 26 causes the movable latching member 60 to pivot about point P (FIG. 3) in the direction of arrow C. Pivotal movement of the latching member 60 causes latching finger 64 to move out of contact with the movable contact arm 70 so that the arm 70 returns to its unstressed condition, and the conductive path is broken. Resetting of the device is achieved as described above.

Figure 9:
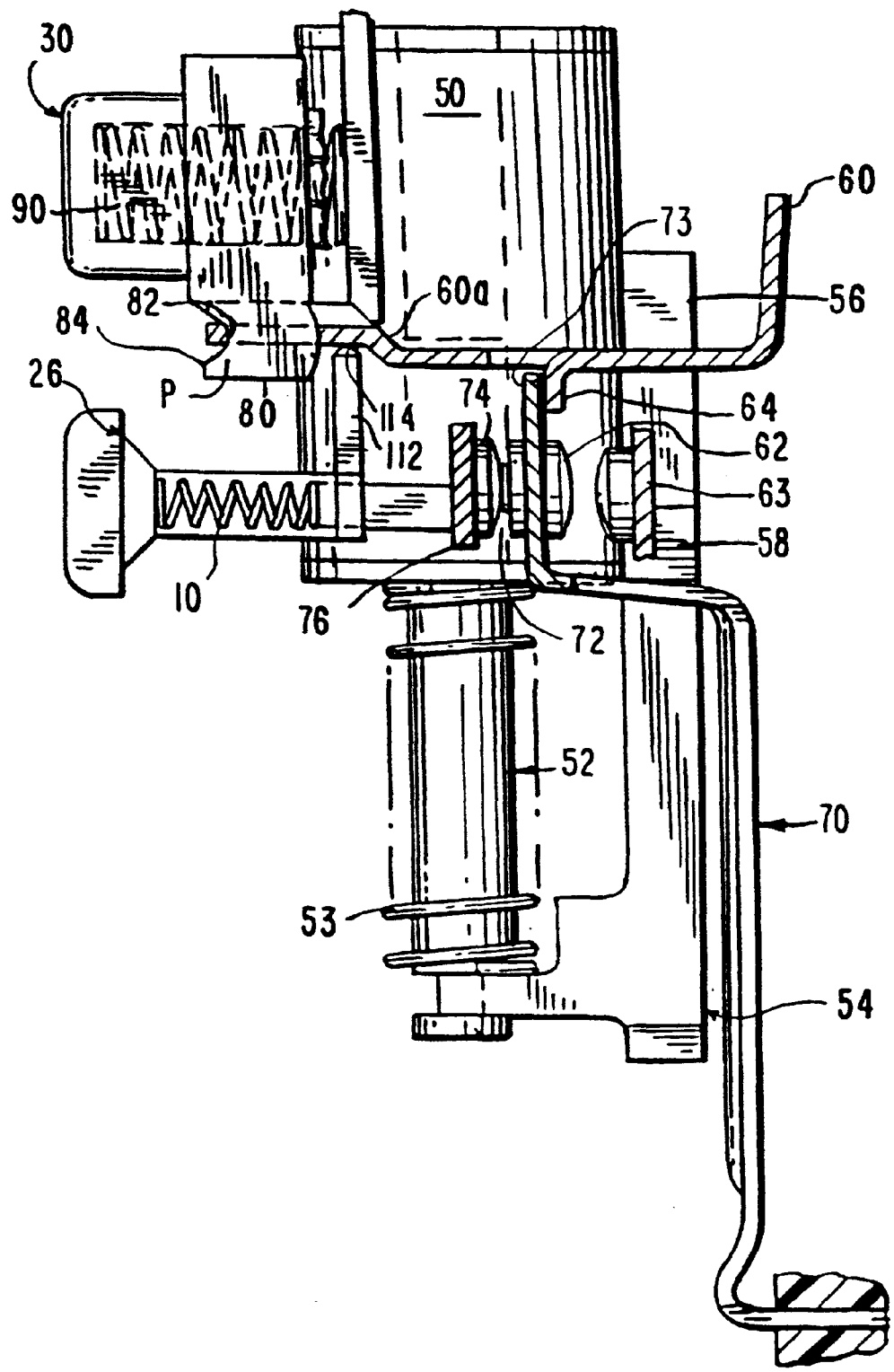
FIG. 9 is side elevational view, partly in section, of components of an alternative embodiment of the independent trip mechanism, illustrating the components when the circuit interrupting device is in a set or circuit making position.
Figure 10:
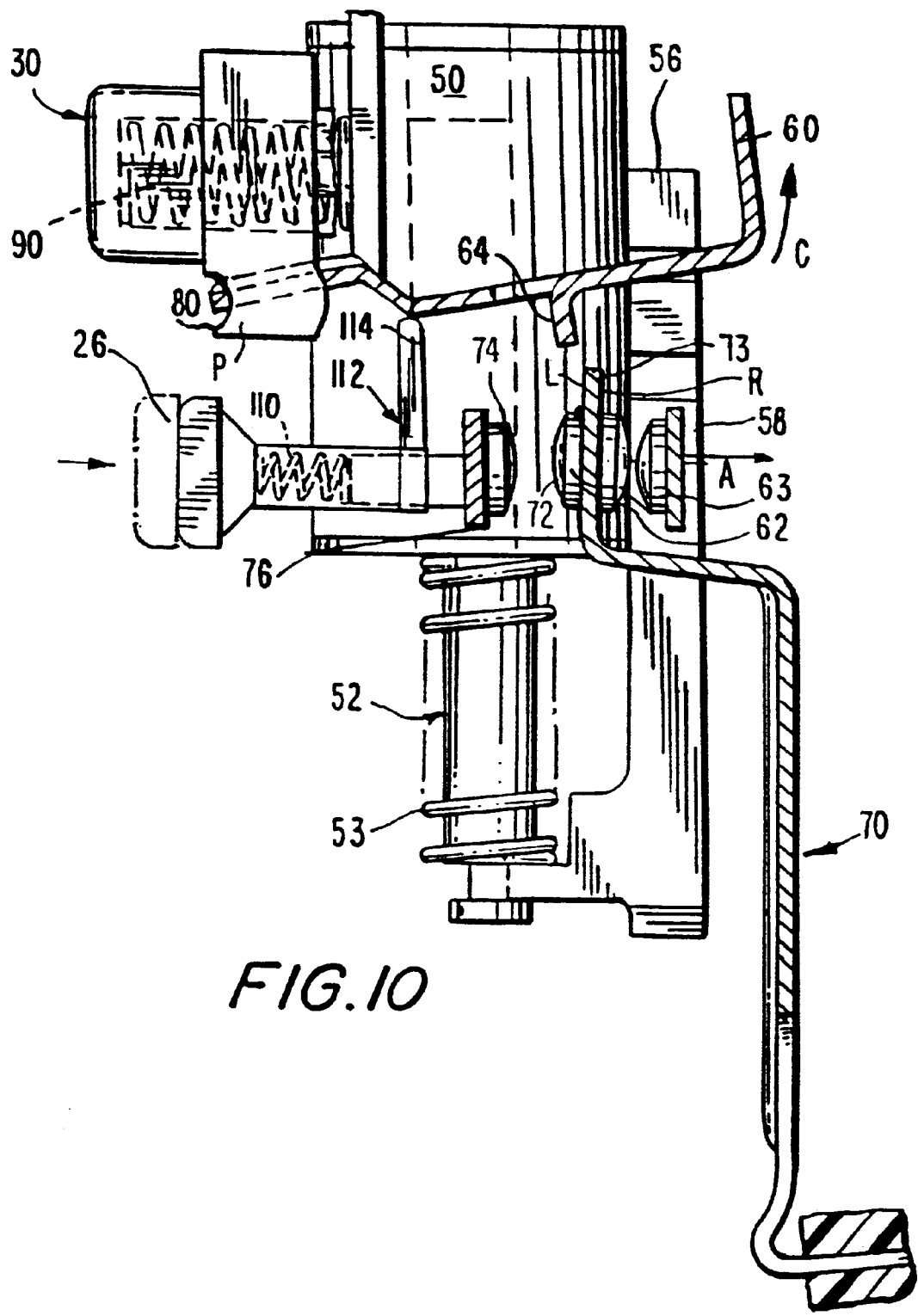
FIG. 10 is a side elevational view similar to FIG. 9, illustrating components of the alternative independent trip mechanism when the circuit interrupting device is in a circuit breaking position.

An alternative embodiment of the trip portion will be described with reference to FIGS. 9 and 10. In this embodiment, the trip portion includes a trip button 26 that is movable between a set position, where contacts 72 and 74 are permitted to close or make contact, as seen in FIG. 9, and a trip position where contacts 72 and 74 are caused to open, as seen in FIG. 10. Spring 110 normally biases trip button 26 toward the set position. The trip portion also includes a trip arm 112 that extends from the trip button 26 so that a distal end 114 of the trip arm is in movable contact with the movable latching member 60. As noted above, the movable latching member 60 is, in this embodiment, common to the trip, circuit interrupting, reset and reset lockout portions and used to make, break or lockout the electrical connections between the input and output conductive paths.

In this embodiment, the movable latching member 60 includes a ramped portion 60a which facilitates opening and closing of electrical contacts 72 and 74 when the trip button 26 is moved between the set and trip positions, respectively. To illustrate, when the trip button 26 is in the set position, distal end 114 of trip arm 112 contacts the upper side of the ramped portion 60*a*, seen in FIG. 9. When the trip button 26 is depressed, the distal end 114 of the trip arm 112 moves along the ramp and pivots the latching member 60 about point P in the direction of arrow C causing latching fingers 64 of the latching member 60 to move out of contact with the movable contact arm 70 so that the arm 70 returns to its unstressed condition, and the conductive path is broken. Resetting of the device is achieved as described above.

Using the reset lockout feature described above permits the resetting of the GFCI device or any of the other devices in the family of circuit interrupting devices only if the circuit interrupting portion is operational. Thus, testing of the circuit interrupting portion occurs during the reset operation. Further, if the circuit interrupting portion becomes non-operational after the device is set, the independent trip mechanism can still trip the device. In other words, the circuit interrupting device according to the present application can be tripped whether or not the circuit interrupting portion is operating properly.

Figure 11:
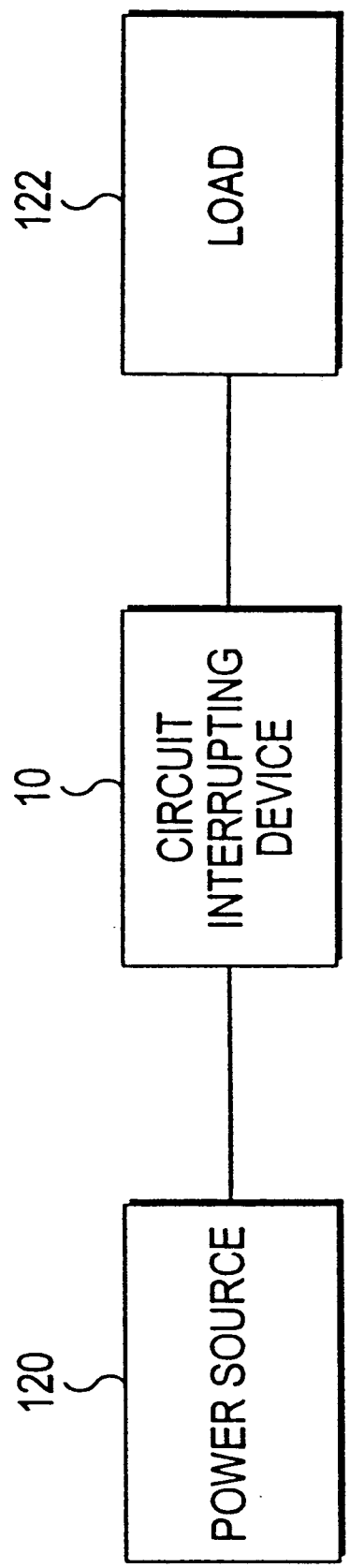
FIG. 11 is a block diagram of a circuit interrupting system according to the present application that incorporates a ground fault circuit interrupter receptacle.

The circuit interrupting device according to the present application can be used in electrical systems, shown in the exemplary block diagram of FIG. 11. The system includes a source of power 120, such as ac power in a home, at least one circuit interrupting device 10 electrically connected to the power source, and one or more loads 122 connected to the circuit interrupting device. As an example of one such system, ac power supplied to single gang junction box in a home may be connected to a GFCI receptacle having the above described independent trip and reset lockout features, is installed in the junction box. Household appliances that are then plugged into the receptacle become the load or loads of the system.

Circuit Breakers

As noted above, various types of circuit interrupting devices are contemplated by the present application. The resettable receptacle with fault protection described above is one example. Another example is a resettable circuit breaker with fault protection. Generally, such circuit breakers are used as resettable branch circuit protection devices, which are capable of opening a conductive path supplying electrical power to various loads in a power distribution system (or sub-system) if a fault occurs or if the current rating of the circuit breaker is exceeded. Such circuit breakers are also capable of being reset to close the conductive path. The conductive path is typically divided between a line side and a load side. Thus, the circuit breaker has line and load phase (or power) connections. The line side has a line phase connection and the load side has a load phase connection. The line phase connection connects to supplied power and the load phase connection connects to one or more loads. The connections are connection points where external conductors can be connected to the circuit breaker. These connections may be, for example, electrical fastening devices, such as binding screws, lugs or binding plates, that secure the external conductor to the circuit breaker, as well as conduct electricity.

As noted above, the circuit breakers according to the present application can provide fault protection for various types of faults or combination of faults. Examples of the various faults contemplated include ground faults, arc fault, immersion detection faults, appliance leakage faults and equipment leakage faults. Although many various types of fault protection circuit breakers are contemplated, the following descriptions are for GFCI circuit breakers and AFCI circuit breakers.

Ground Fault Circuit Interrupter Circuit Breakers

An exemplary embodiment of a GFCI circuit breaker incorporating a reset lockout will now be described. Generally, each GFCI circuit breaker according to the present application has a circuit interrupting portion, a reset portion and a reset lockout. The GFCI circuit breaker may also include a trip portion that operates independently of the circuit interrupting portion.

The circuit interrupting and reset portions preferably use electromechanical components to break (open) and make (close) the conductive path between the line and load phase connections. However, electrical components, such as solid state switches and supporting circuitry, may be used to open and close the conductive path. Similar to the embodiments described above, the circuit interrupting portion is used to automatically break electrical continuity in the conductive path (i.e., open the conductive path) between the line and load phase connections upon the detection of a ground fault. The reset portion is used to disable the reset lockout and to permit the closing of the conductive path. That is, the reset portion permits re-establishing electrical continuity in the conductive path from the line connection to the load connection. Operation of the reset and reset lockout portions is in conjunction with the operation of the circuit interrupting portion, so that the electrically conductive path between the line and load phase connections cannot be reset if the circuit interrupting portion is non-operational and/or if an open neutral condition exists.

Circuit breakers with an independent trip portion can still be tripped, i.e., the conductive path between the line and load phase connections can still be opened, even if the circuit interrupting portion becomes non-operational. Preferably, the trip portion is manually activated and uses mechanical components to open the conductive path. However, the trip portion may use electrical components, such as solid state switches and supporting circuitry, and/or electromechanical components, such as relay switches, to open the conductive path between the line and load phase connections.

Figure 12:
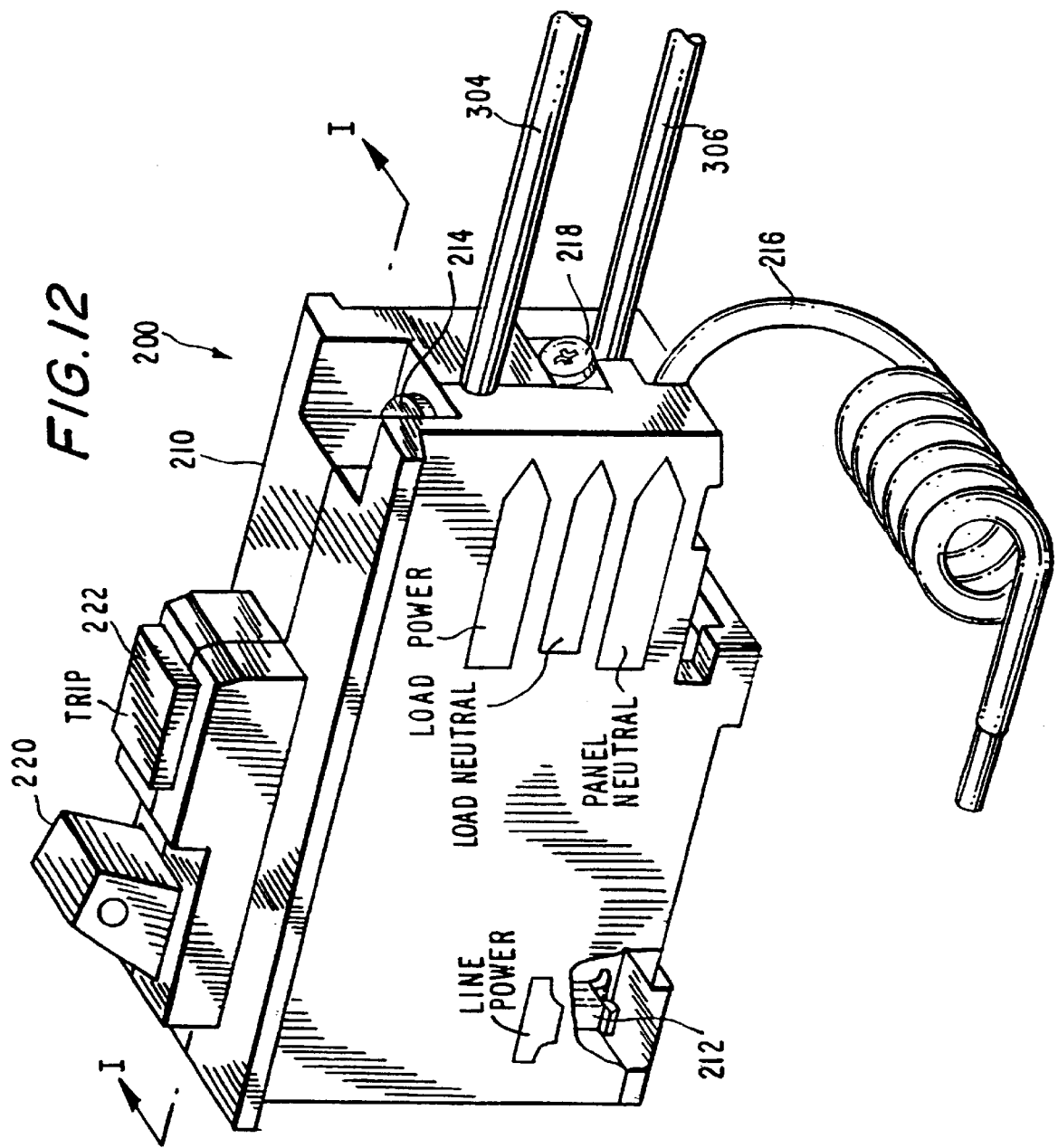
FIG. 12 is a perspective view of an exemplary ground fault circuit interrupting circuit breaker according to the present application.

Referring now to FIG. 12, the GFCI circuit breaker 200 has a housing 210 configured for installation in conventional circuit breaker panels (not shown). Line and load power (phase) connections 212 and 214, and line and load neutral connections 216 and 218 are accessible from an exterior of the housing 210 and are provided for connecting the circuit breaker to external wiring. An actuator 220 extends through an exterior surface of the housing 210 and is used to manually set the operating condition or state of the circuit breaker. A trip actuator 222, which will be described in more detail below, extends through the exterior surface of the housing 210. The trip actuator 222 is used, in this exemplary embodiment, to mechanically trip the GFCI circuit breaker independent of the operation of the circuit interrupting portion.

Figure 13:
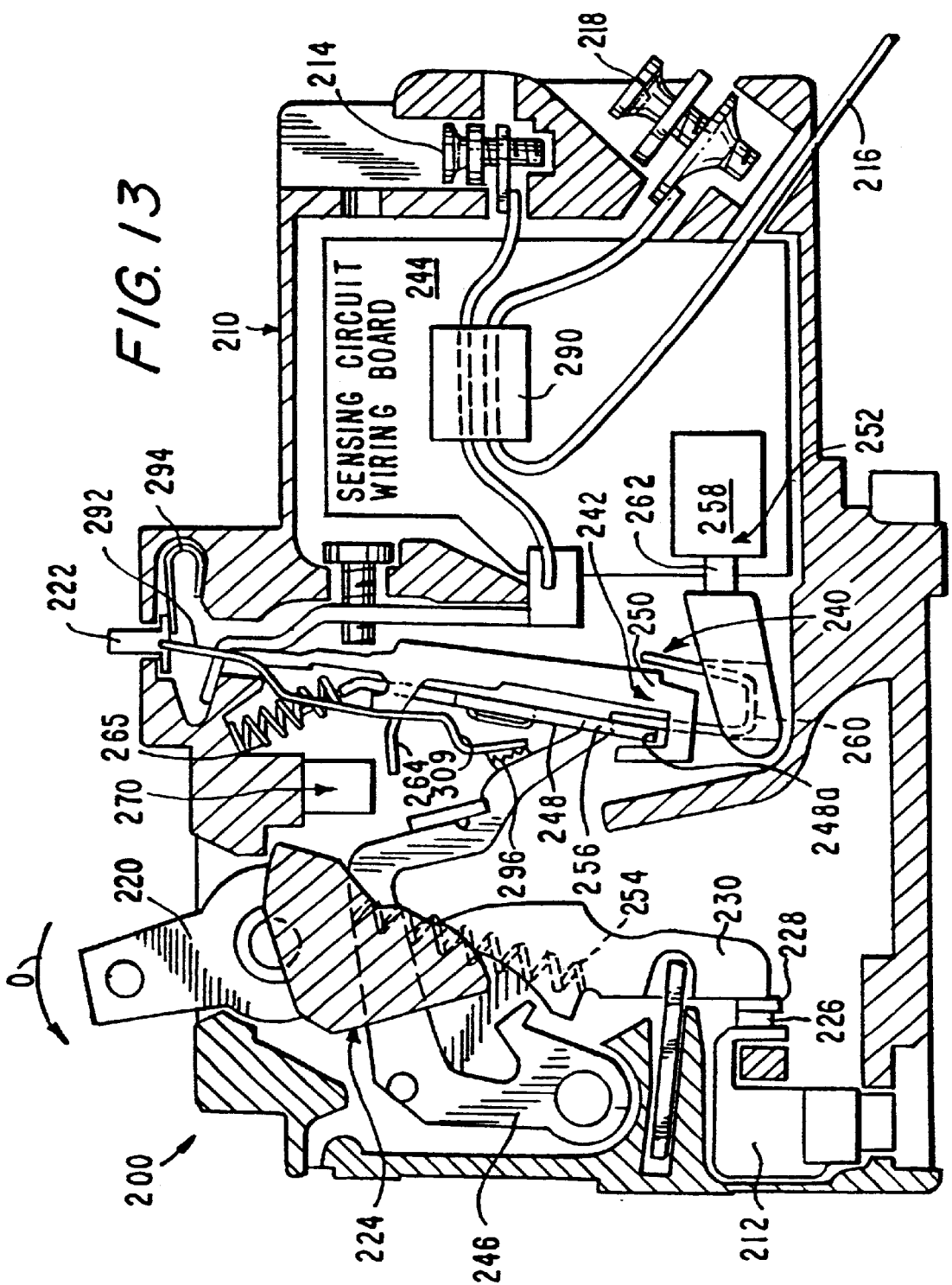
FIG. 13 is a cross-sectional view of the GFCI circuit breaker of FIG. 12, taken along line I—I, illustrating the breaker in an 'on' state.

Referring to FIG. 13, a power control assembly 224, which forms a portion of the conductive path, is used to make and break the conductive path. Generally, the power control assembly 224 operates similar to the operation of a toggle switch. In the exemplary embodiment shown in FIGS. 13–18, the power control assembly 224 includes the actuator 220 which is movable between 'on', 'off' and 'trip' positions and a pair of electrical contacts 226 and 228 that are opened and closed depending upon the state the circuit breaker is in. Preferably, one of the contacts is fixed relative to the other. For example, in the embodiment shown in FIG.

13, fixed contact 226 is attached to or monolithically formed into the line power connection 212, and the movable contact 228 is attached to or monolithically formed into movable contact arm 230. However, the present application also contemplates circuit breaker configurations where each contact is movable relative to the other.

Figure 14:
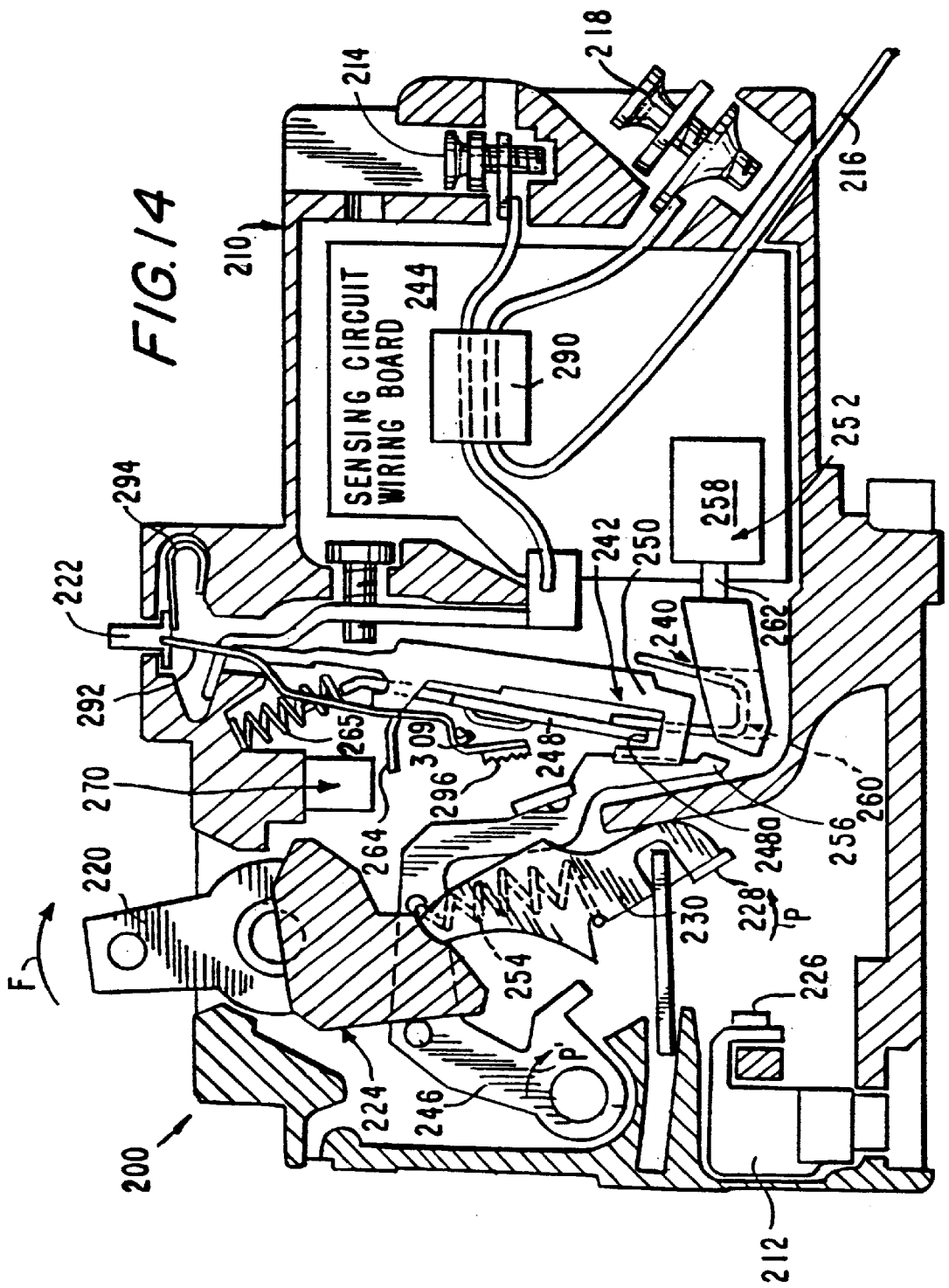
FIG. 14 is a cross sectional view of the GFCI circuit breaker of FIG. 12 similar to FIG. 13 and illustrating the breaker in a 'tripped' state.

The movable contact arm 230 is pivotally connected to the actuator 220 such that movement of the actuator is translated to movement of the contact arm 230, or movement of the contact arm 230 is translated to movement of the actuator 220. Preferably, the contact arm 230 is movable between a closed position where contacts 226 and 228 are closed and the conductive path is completed (FIG. 13), and an open position where contacts 226 and 228 are open and the conductive path is broken (FIG. 14). When the contacts are closed, the circuit breaker 200 is in an 'on' state so that electricity can flow from the line connection to the load connection and the ground fault protection is armed. When the contacts are open, the circuit breaker 200 can be in either a 'tripped' state or an 'off' state. In the 'tripped' state, current cannot flow from the line connection to the load connection and the reset lockout is enabled. In the 'off' state current cannot flow from the line connection to the load connection but the reset lockout is not enabled.

A trip/reset assembly 240 is operatively coupled to the power control assembly 224 and is used for ground fault protection and resetting of the circuit breaker 200. In this embodiment, the trip/reset assembly operates as the above-described circuit interrupting portion and the reset portion. When the trip/reset assembly operates to provide fault protection, the assembly operates as the circuit interrupting portion. When the trip/reset assembly 240 operates to reset the circuit breaker, the assembly operates as the reset portion. The trip/reset assembly also provides the current protection for the circuit breaker 200. That is, if the current flowing from the line connection to the load connection exceeds a predetermined current rating for the circuit breaker (e.g., 15 amps), then the trip/reset assembly will respond by causing the power control assembly 224 to open the conductive path, e.g., contacts 226 and 228 will open.

Figure 17:
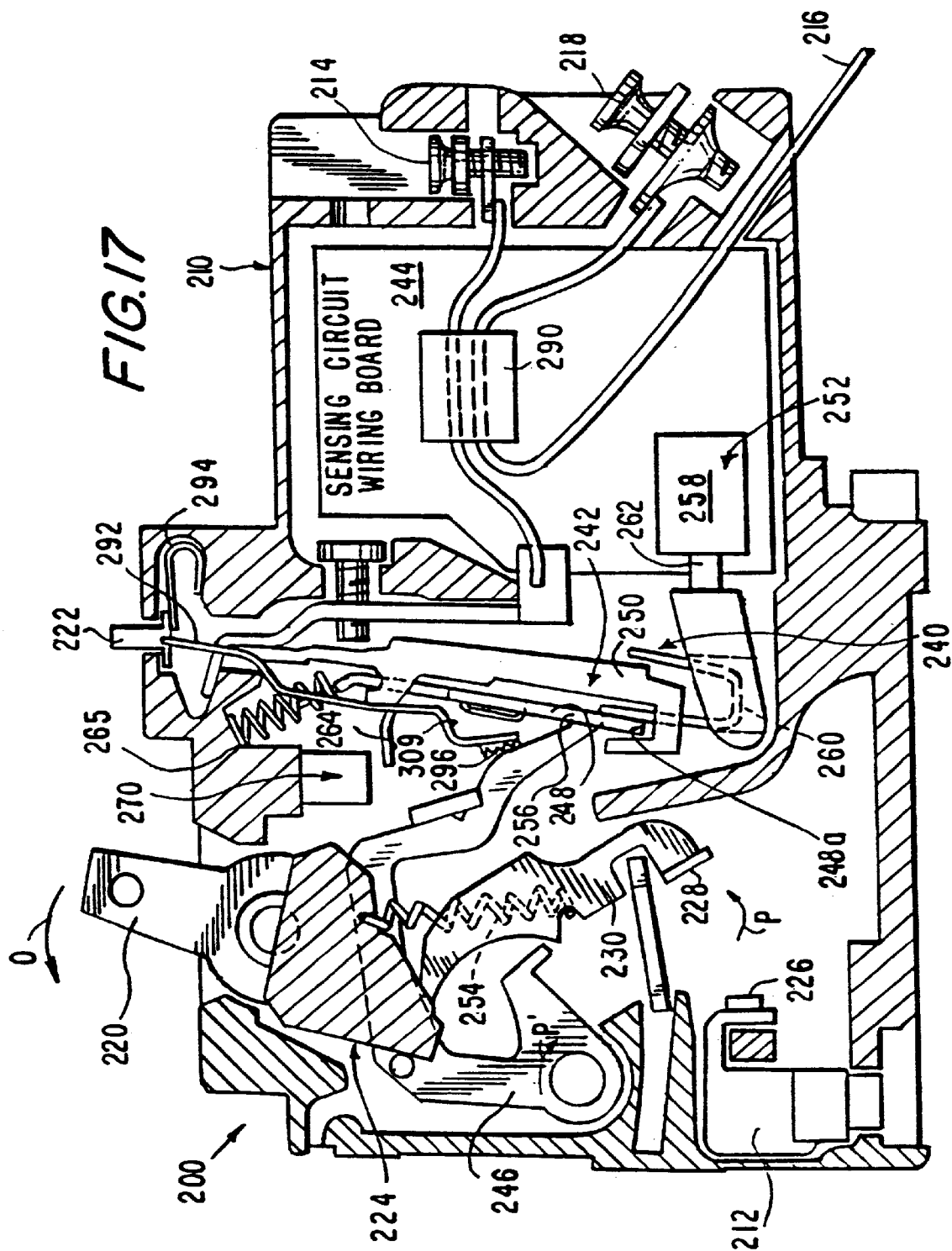
FIG. 17 is a cross sectional view of the GFCI circuit breaker of FIG. 12 similar to FIG. 13 and illustrating the breaker in an 'off' state.
Figure 18:
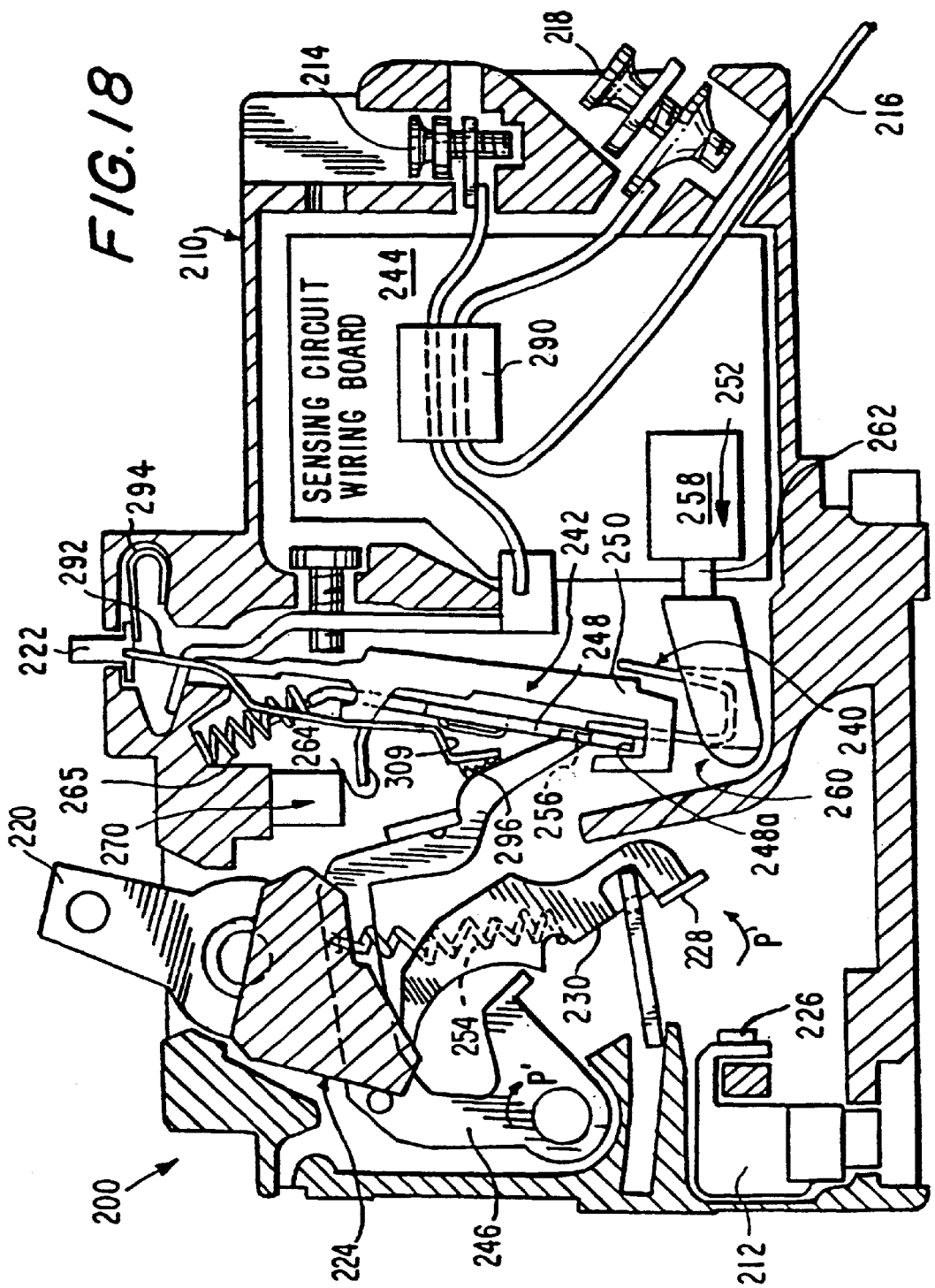
FIG. 18 is a cross sectional view of the GFCI circuit breaker of FIG. 12 similar to FIG. 13 and illustrating partial activation of the independent trip portion of the breaker.
Figure 19:
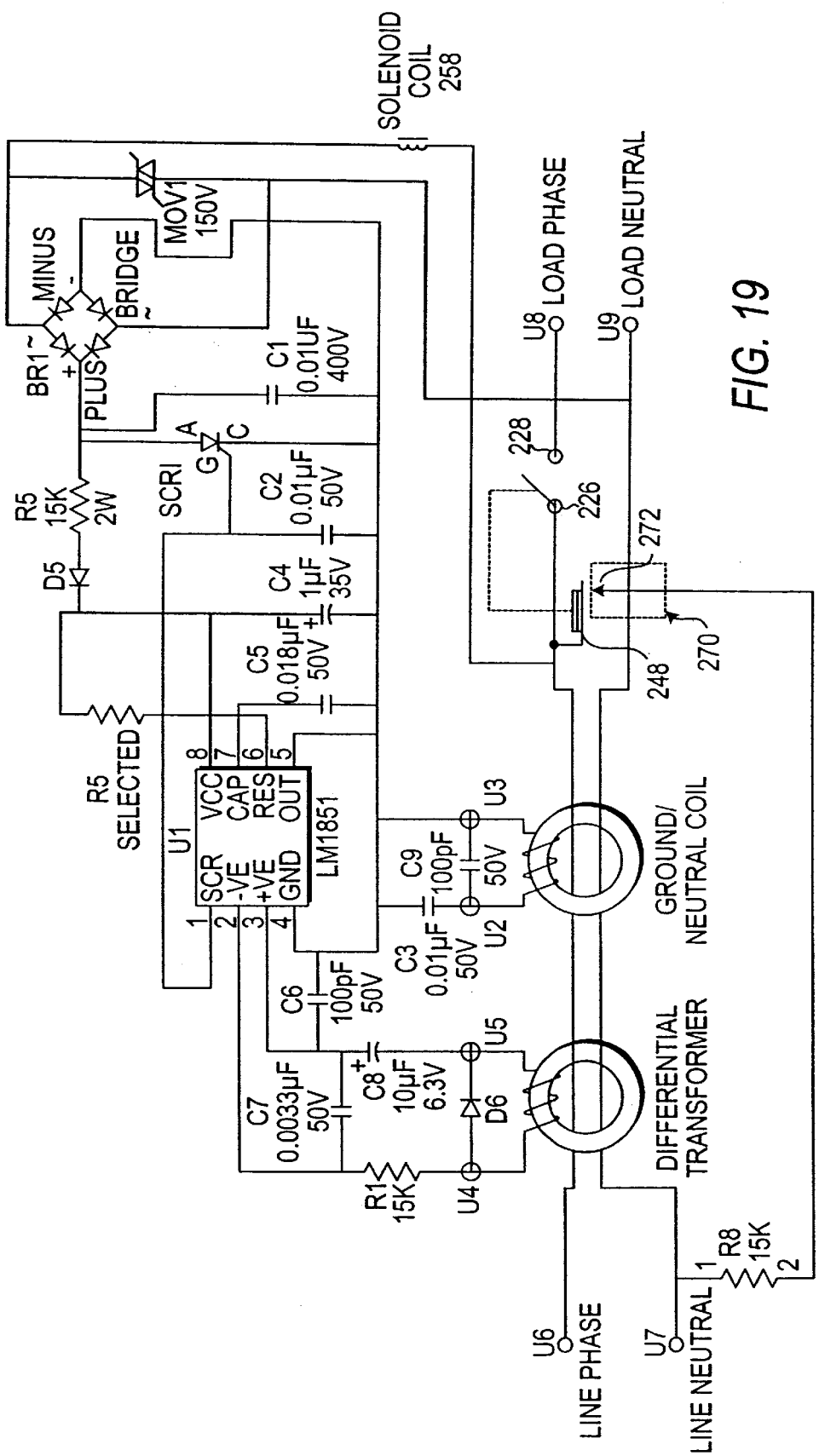
FIGS. 19 and 20 are circuit diagrams for various embodiments of the sensing circuitry used to sense ground faults and switching configurations for a reset enable switch assembly used when resetting the circuit breaker.
Figure 20:
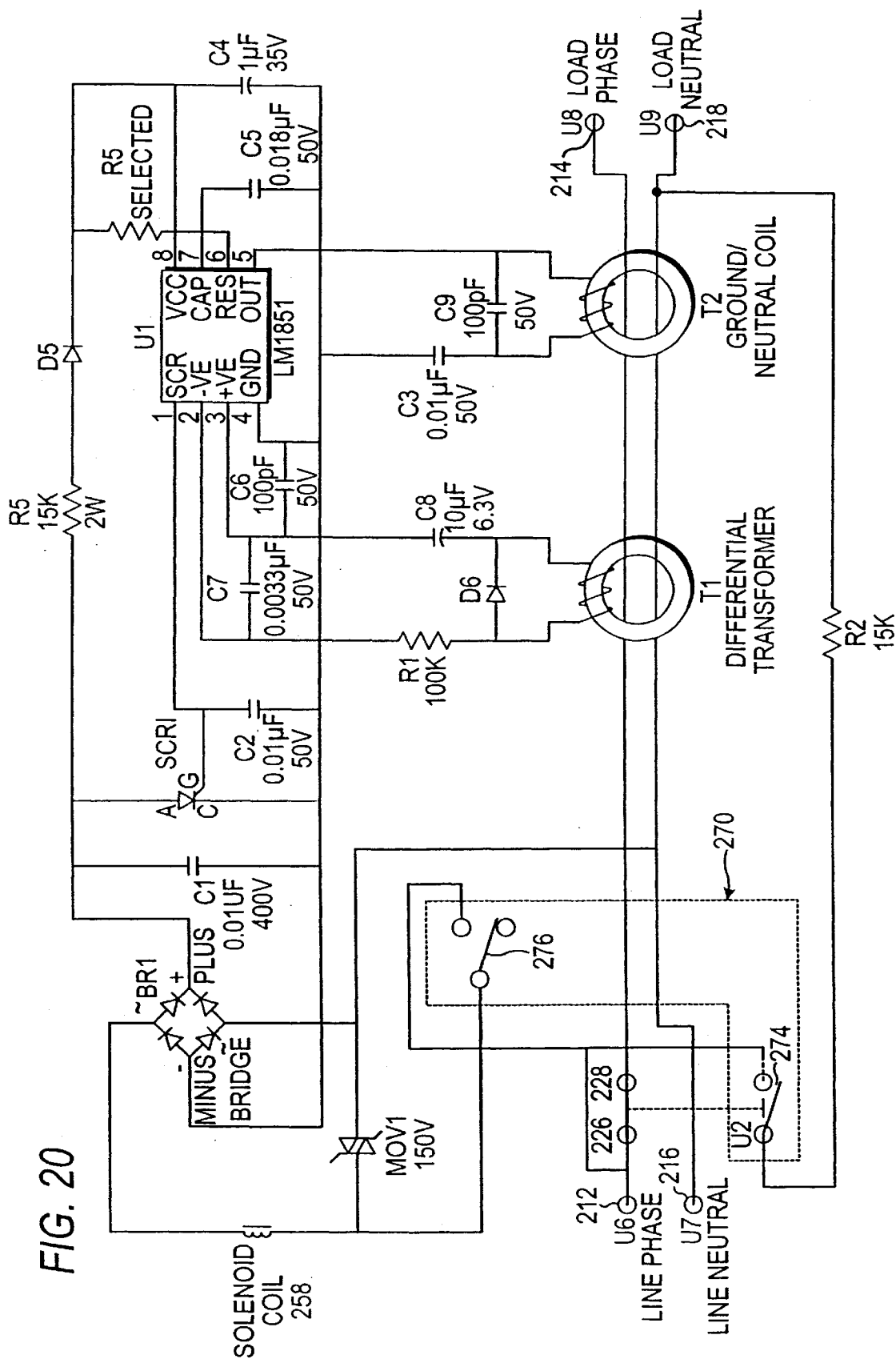
Figure 21:
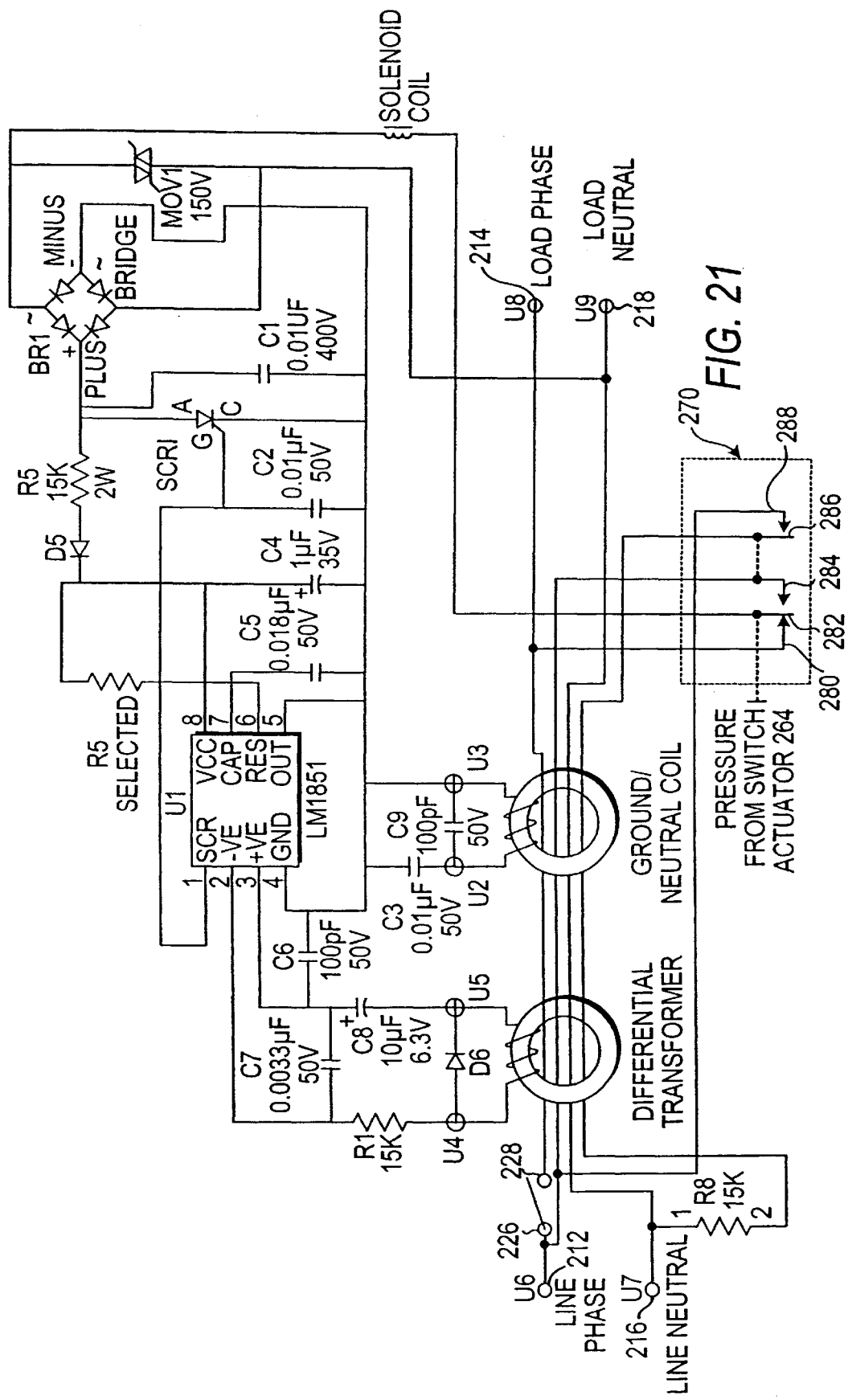
FIG. 21 is another alternative switching configuration for the reset enable switch assembly used when resetting the circuit breaker.

The trip/reset assembly 240 according to this exemplary embodiment includes mechanical linkage 242 to the power control assembly and sensing circuitry included on wiring board 244. The sensing circuitry, examples of which are shown in FIGS. 19–21, is used to sense ground faults and is similar to the sensing circuitry shown in FIG. 8. However, other known circuits capable of detecting ground faults may also be utilized. The test/reset assembly mechanical linkage 242 includes control arm 246, latch arm 248 that is movably coupled to latch arm support 250, and latch arm controller 252. The control arm 246 is operatively coupled to the movable contact arm 230 via spring 254, so that if the actuator 220 is in the 'on' position (FIG. 13), the control arm catch 256 is releasably latched to the latch arm 248 to arm the ground fault protection, as seen in FIG. 13. Similarly, when the actuator 220 is in the 'off' position (FIG. 17) the control arm catch 256 is releasably latched to the latch arm 248, as seen in FIG. 17. When the actuator 220 is in the 'trip' position (FIG. 14), the control arm catch 256 disengages from the latch arm 248 and the reset lockout is enabled. It should be noted that in this embodiment, the control arm catch 256 also operates as the reset lockout which will be described in more detail below.

The latch arm controller 252 includes solenoid 258 and latch arm linkage 260 which couples the latch arm 248 to the solenoid piston 262 such that movement of the solenoid piston is translated to pivotal movement of the latch arm 248. The trip/reset assembly 240 also includes a reset enable switch assembly 270 that is activated by switch activator 264 secured to the latch arm 248. The reset enable switch assembly is provided to induce or simulate a ground fault condition on the sensing circuitry so that the circuit interrupting portion is activated to disable the reset lockout, as will be described in more detail below. As noted, the latch arm 248 is pivotally movable relative to the latch arm support 250. In addition, the latch arm is also movable in a direction parallel to the latch arm support 250 such that upward movement of the latch arm 248 causes the switch actuator 264 to move in a manner which activates the reset enable switch assembly 270 which, in turn, activates the circuit interrupting portion, if operational. If the circuit interrupting portion is not operational, the circuit breaker cannot be reset. Various switching arrangements for the reset enable switch assembly 270 are shown in FIGS. 19–21. For example, in FIG. 19, the reset enable switch assembly 270 includes a fixed contact 272, that may be a rigid wire strip, which induces and/or simulates a ground fault when the fixed contact 272 and the switch actuator 264 of the latch arm 248 come into contact. Simulating the ground fault causes the solenoid 258 to energize. The power for the circuit in FIG. 19 is supplied by the line side connection.

In FIG. 20, the reset enable switch assembly 270 includes a pair of momentary switches 274 and 276. In some circuit breaker designs power to the sensing circuitry is from the load side, so that when the circuit breaker trips power to the sensing circuit is turned off. In this embodiment, switch 276 is a normally closed momentary switch. When in the closed position, switch 276 powers the sensing circuitry from the load side of the breaker contacts and when activated during a reset operation, momentarily powers the sensing circuitry from the line side connection 212 and then returns to the normally closed position if the circuit breaker resets. Switch 274 is preferably configured so that it is opened when contacts 226, 228 are closed, and so that it is closed when the breaker contacts 226, 228 are opened. To avoid unintended simulated ground fault conditions, switch 274 opens before the circuit breaker contacts 226, 228 close, and switch 274 closes after the circuit breaker contacts 226, 228 open. This functions to introduce a simulated fault condition to the sensing circuitry. As the sensing circuitry is being powered from the load side and the breaker contacts are open the solenoid 258 is not activated. When a reset operation is being performed so that power is temporarily switched to the line side by switch 276, the solenoid is capable of being energized to permit resetting of the circuit breaker.

In FIG. 21, the reset enable switch assembly 270 includes a series of switch contacts 280, 282, 284, 286 and 288 which are sequentially activated or deactivated (depending upon their normal state) by pressure from the switch actuator 264 as the latch arm 248 moves in direction U (FIG. 15) when moving actuator 220 to the 'off' position. For example, initial motion of the switch actuator 264 breaks contact 280 from contact 282. Continued pressure causes contact 282 to close with contact 284. Further pressure causes contact 286 to close with contact 288 which introduces a phase voltage to the sensing circuitry, thus, simulating a ground fault. It should be noted that in both embodiments, power is connected to the sensing circuitry from the load connection side when the circuit breaker 200 is in the 'on', 'off' or 'tripped' states, and power is supplied to the sensing circuitry from the line connection side while resetting the circuit breaker.

To prevent multiple firings of the solenoid, the reset enable switch assembly is preferably configured to induce and/or simulate the ground fault condition while in the lock-out condition until solenoid 258 trips latch arm 248 and releases control arm catch 256 or actuator 220 is released. Thus, in the embodiment of FIG. 19, the switch actuator 264 is positioned on the latch arm 248 so that when the reset lockout is disabled, the latch arm 248, and thus the switch actuator 264, move away from the reset enable switch assembly in response to the biasing force of spring 265, so that the switch becomes deactivated.

The portion of the trip/reset assembly used to perform the tripping operation is also designated as the circuit interrupting portion, and the portion of the trip/reset assembly used to perform the reset operation is also designated as the reset portion. Further, the portion of the trip/reset assembly used to perform current protection is also designated as the current protection portion.

Figure 15:
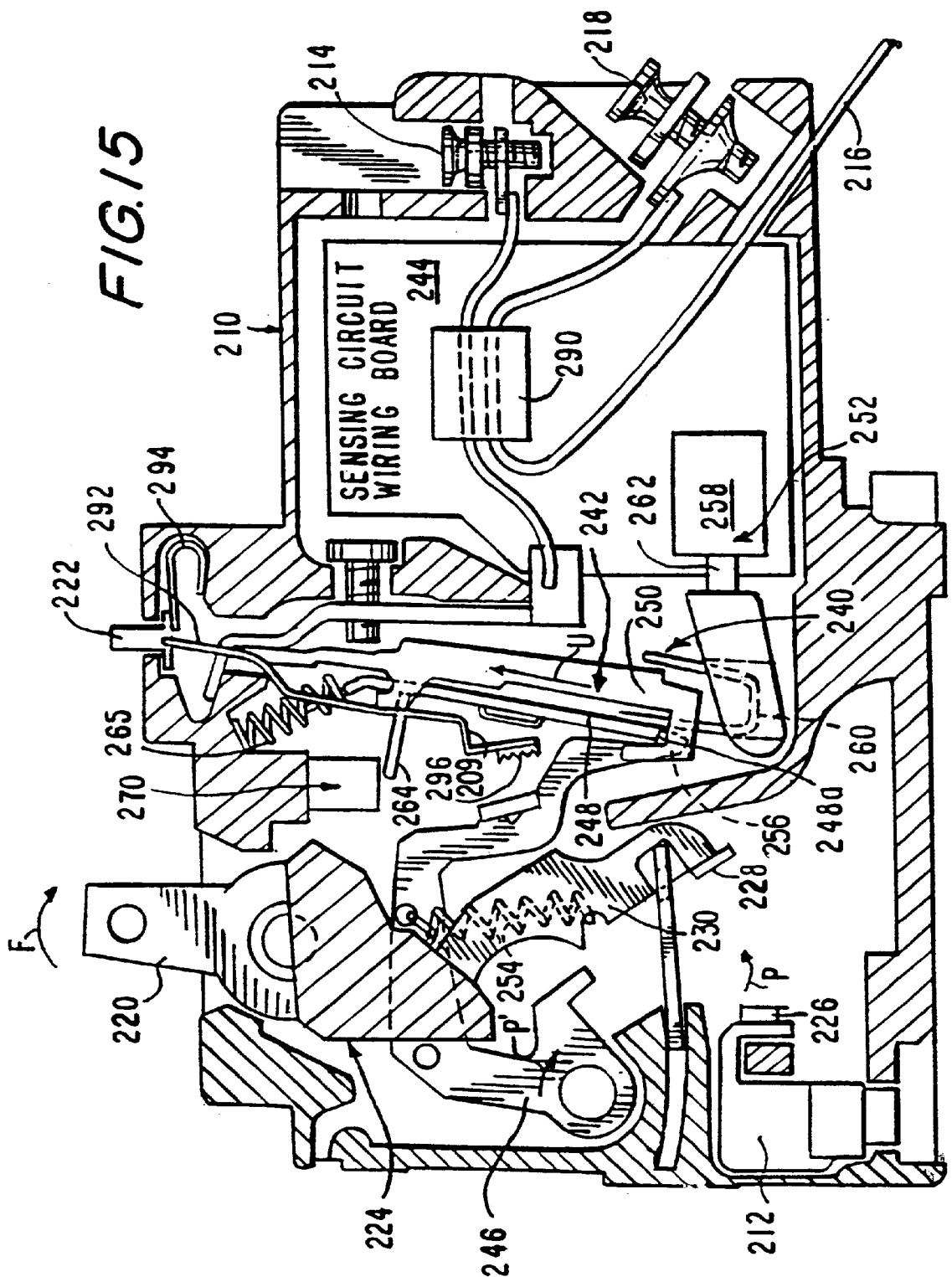
FIG. 15 is a cross sectional view of the GFCI circuit breaker of FIG. 12 similar to FIG. 13 and illustrating the breaker with the reset lockout in a lockout position.
Figure 16:
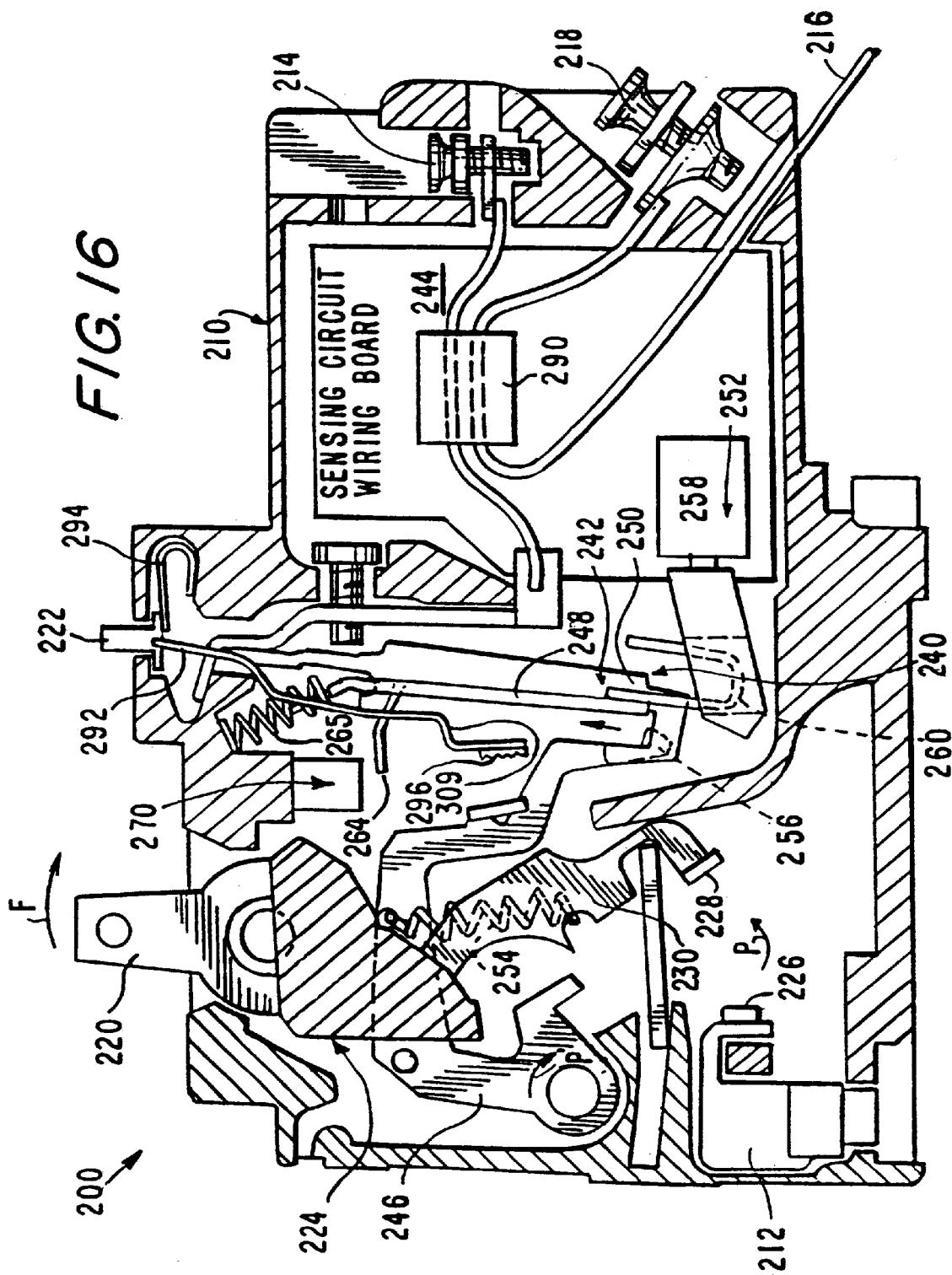
FIG. 16 is a cross sectional view of the GFCI circuit breaker of FIG. 12 similar to FIG. 15 and illustrating the reset lockout removed from the lockout position.

Referring now to FIGS. 14 and 15, the reset lockout inhibits the actuator 220 in the power control assembly 220 from moving from the 'tripped' position to the 'off' position so that the circuit breaker cannot be reset. In the embodiment shown in FIGS. 14 and 15, the reset lockout operates as an active lockout in which the lockout actively inhibits (or prevents) the actuator 220 from moving from the 'tripped' position to the 'off' position. However, the reset lockout may also be configured to passively inhibit movement of the actuator 220 by, for example, the inherent operation of a spring. The reset lockout includes the control arm catch 256 attached to or formed into the control arm 246 so that when the actuator 220 is manually moved in the direction of arrow F, toward the 'off' position, the catch 256 engages surface 248a of the latch arm 248 which inhibits movement of the actuator 220.

In this embodiment, the conductive path extends from line power connection 212 to load power connection 214 via the power control assembly 224, the trip/reset assembly and transformer assembly 290. The transformer assembly includes a differential transformer and ground/neutral coil shown in FIGS. 19 and 20.

Typically, circuit breakers are reset by first moving the actuator 220 to the 'off' position and then moving the actuator to the 'on' position. While this sequence of movements of the actuator are being performed, the control arm 246 and latch arm 248 are moved so that the control arm catch 256 is releasably latched to the latch arm 248. The circuit breaker is in the 'on' state so that the conductive path is closed and ground fault protection is armed.

The operation of the circuit breaker 200 embodiment according to the present application will now be described with reference to FIGS. 13–18. As noted, the actuator 220 is movable between 'on', 'off' and 'trip' positions, where the 'trip' position is typically between the 'on' and 'off' positions. To put the circuit breaker in the 'on' position (from the 'off' position, FIG. 17) the actuator 220 of the power control assembly 224 is moved in the direction of arrow O. When in the 'on' position (FIG. 13), the conductive path between the line and load connections is closed, the control arm catch 256 is releasably latched to the latch arm 248, as seen in FIG. 13, and the reset enable switch assembly 270 is in its normal state. At this point the circuit breaker is in the 'on' state, where the ground fault protection is armed and the breaker is capable of tripping.

If a fault is detected by the sensing circuitry, the solenoid 258 is energized so that the solenoid piston 262 retracts, causing the latch arm linkage 260 to pull the latch arm 248 away from the control arm 246. Once the latch arm 248 moves far enough away from the control arm 246 the control arm catch 256 is released from the latch arm 248. After the catch 256 is released, the tension in spring 254 causes the control arm 246 to pivot in the direction of arrow P' permitting arm 230 to pivot in direction P causing contacts 226, 228 to open and the actuator 220 to automatically move to the 'trip' position, seen in FIG. 14. At this time, the circuit breaker is in the 'tripped' state.

When the circuit breaker is in the 'tripped' state, the reset lockout portion of the breaker is enabled, as seen in FIG. 14, so that the circuit breaker cannot be reset, unless the circuit interrupting portion is operational to disable the reset lockout. FIG. 15 shows the control arm catch 256 (i.e., the reset lockout) in a lockout position where catch 256 is engaged with the surface 248a of the latch arm 248, thus preventing further movement of the actuator 220 toward the 'off' position.

To reset the circuit breaker, further movement of the actuator 220 in the direction of arrow F activates reset enable switch assembly 270 so that if the circuit interrupting portion is operational, the solenoid 258 will energize causing the latch arm linkage 260 and thus the latch arm 248 to retract. When the latch arm 248 retracts, the control arm catch 256 disengages from the latch arm 248 so that the actuator 220 is no longer inhibited from moving to the 'off' position, as seen in FIG. 17.

Referring again to FIGS. 13 and 14 the trip portion according to this embodiment of the present application includes the trip actuator 222 and a trip arm 292. Preferably, the trip actuator 222 is a button that is movable between a set position, where contacts 226 and 228 are permitted to close (seen in FIG. 13) and a trip position where contacts 226 and 228 are caused to open (seen in FIG. 14). Spring 294 normally biases trip button 222 toward the set position. The trip arm 292 that extends from the trip button 222 so that a surface 296 of the trip arm 292 can move into contact with the control arm 246 when the trip button 222 is moved toward the trip position (i.e., when the trip button is depressed).

To trip the circuit breaker 200 independently of the operation of the circuit interrupting portion, the trip actuator 222 is depressed so that surface 296 of trip arm 292 pushes against the control arm 246 and surface 309 of trip arm 292 pushes against latch arm 248 causing the control arm catch 256 to release from the latch arm 248. The tension in spring 254 causes the contact arm 246 and thus contact 228 to pivot away from the fixed contact 226, thus opening the conductive path.

Arc Fault Circuit Interrupter Circuit Breakers

An exemplary embodiment of an AFCI circuit breaker incorporating a reset lockout will now be described. Generally, each AFCI circuit breaker according to the present application has a circuit interrupting portion, a reset portion and a reset lockout. Similar to the GFCI circuit breaker, the circuit interrupting and reset portions preferably use electromechanical components to break (open) and make (close) the conductive path between the line and load phase connections. However, electrical components, such as solid state switches and supporting circuitry, may be used to open and close the conductive path. Similar to the embodiments described above, the circuit interrupting portion is used to automatically break electrical continuity in the conductive path (i.e., open the conductive path) between the line and load phase connections upon the detection of an arc fault. The reset portion is used to disable the reset lockout and to permit the closing of the conductive path. That is, the reset portion permits re-establishing electrical continuity in the conductive path from the line side connection to the load side connection. Operation of the reset and reset lockout portions is in conjunction with the operation of the circuit interrupting portion so that the electrically conductive path between the line and load phase connections cannot be reset if the circuit interrupting portion is non-operational and/or if an open neutral condition exists.

Similar to the GFCI circuit breaker, the AFCI circuit breaker may also include a trip portion that operates independently of the circuit interrupting portion. AFCI circuit breakers with this trip portion can still be tripped, i.e., the conductive path between the line and load phase connections can still be opened, even if the circuit interrupting portion becomes non-operational. Preferably, the trip portion is manually activated and uses mechanical components to open the conductive path. However, the trip portion may use electrical components, such as solid state switches and supporting circuitry, and/or electromechanical components, such as relay switches and supporting circuitry, to open the conductive path between the line and load phase connections.

Figure 22:
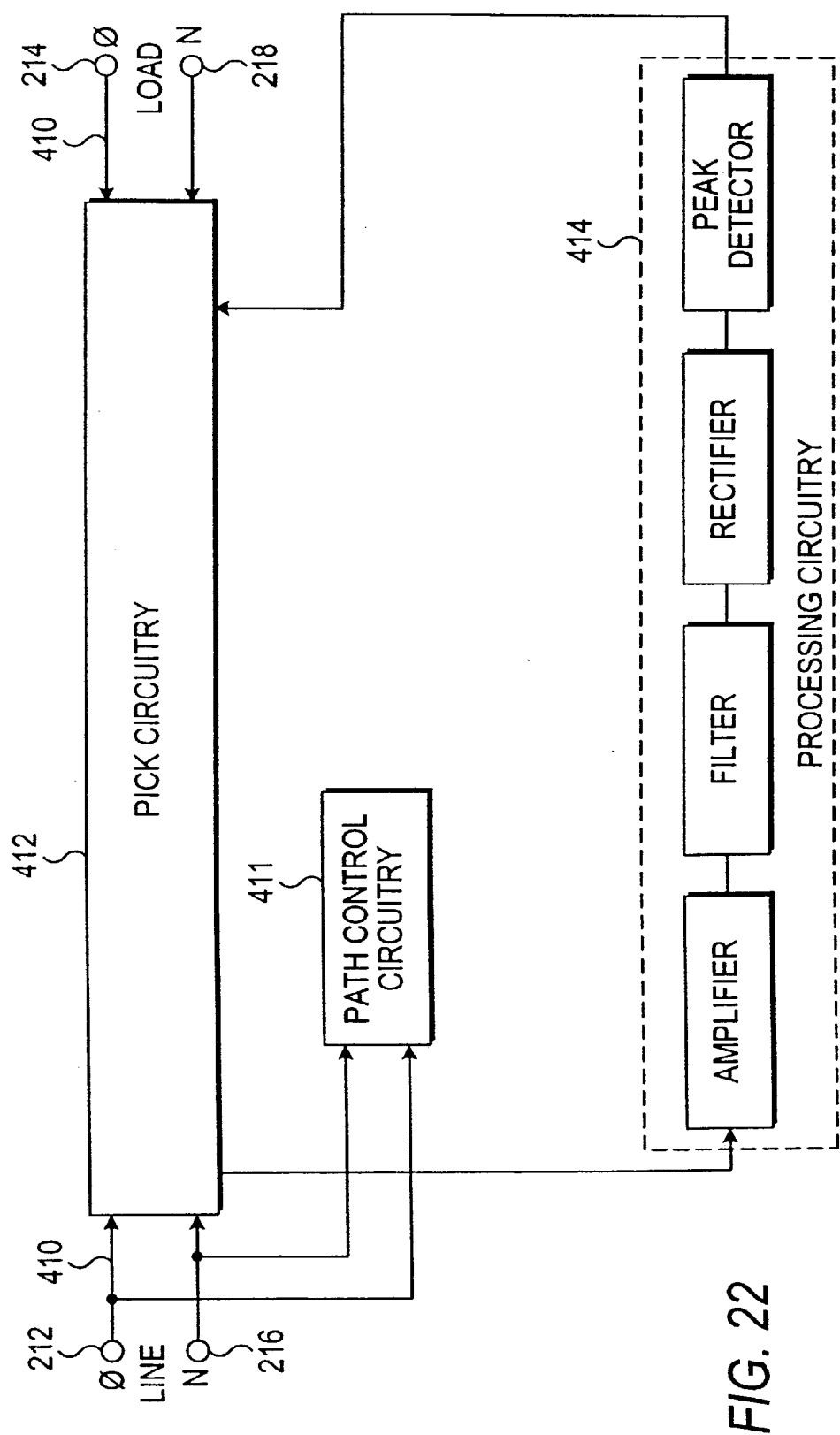
FIG. 22 is a block diagram for the fault sensing circuitry for detecting arc faults.
Figure 23:
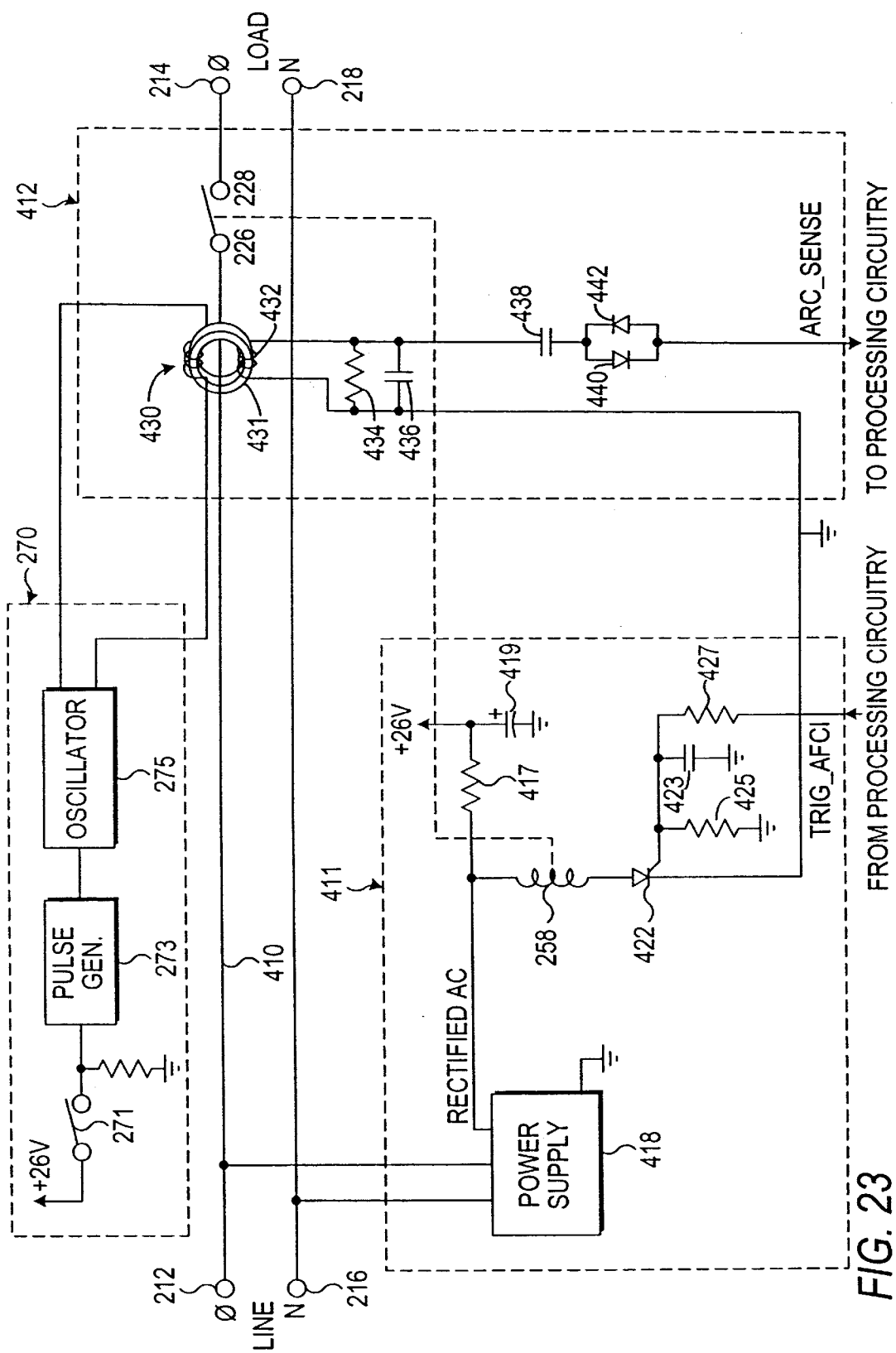
FIG. 23 is a schematic diagram of the monitoring/interrupting circuitry for the fault sensing circuitry of FIG. 22.
Figure 24:
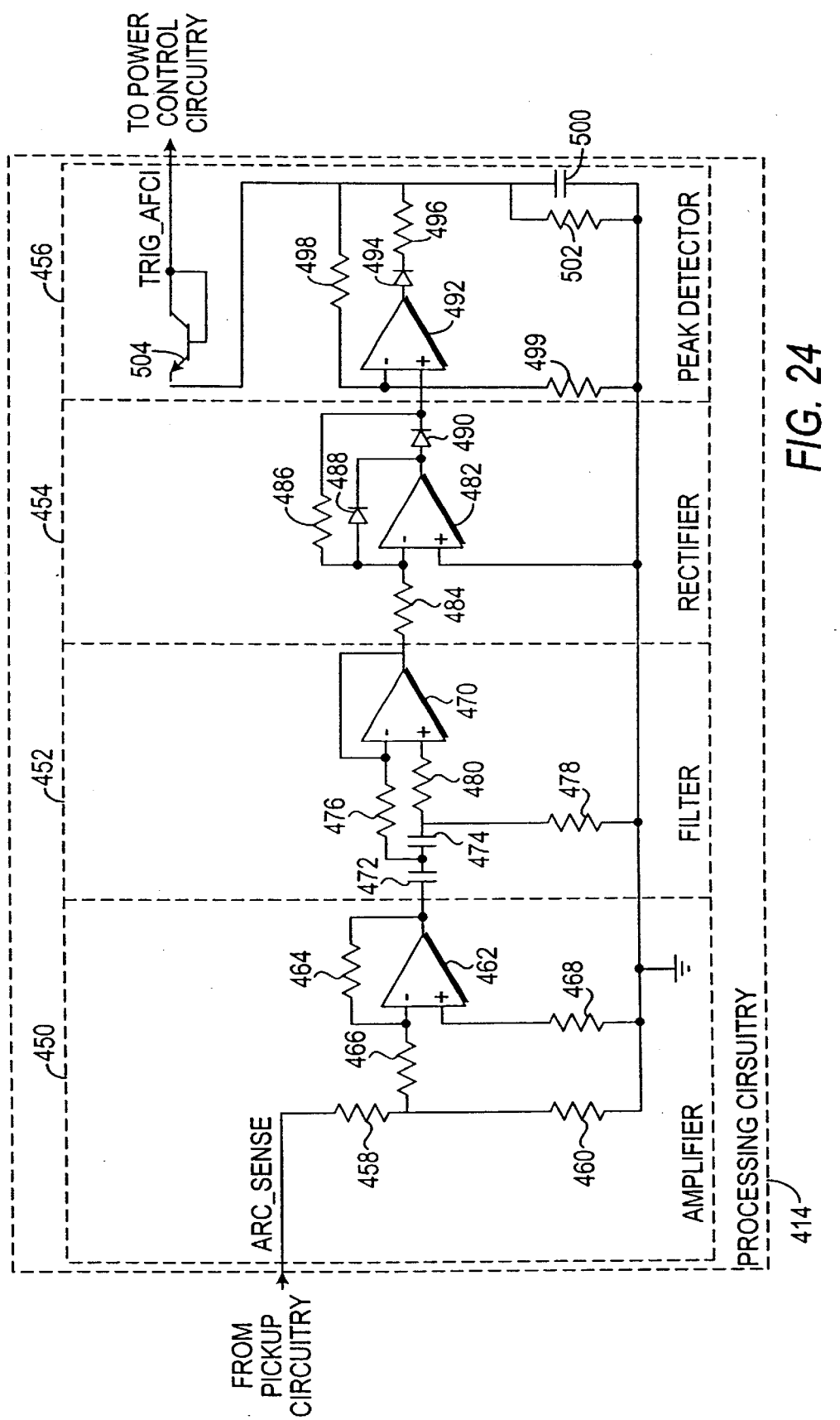
FIG. 24 is a schematic diagram of the processing circuitry for the fault sensing circuitry of FIG. 22.

The circuit interrupting, reset, reset lockout and optional trip portions according to this embodiment are substantially the same as those for the above-described GFCI circuit breaker embodiment. These portions are shown in FIGS. 12–18 and for simplicity the descriptions of these portions are not repeated. A difference between the GFCI and the AFCI circuit breakers is the sensing circuitry used to detect faults. FIGS. 22–24 show one exemplary embodiment of the sensing circuitry that can be used to detect arc faults. However, a more detailed description of the arc fault sensing circuitry can be found in commonly owned, co-pending application Ser. No. 08/994,772, filed Dec. 19, 1997 which is incorporated herein in its entirety by reference. In addition, alternative techniques for sensing arc faults are provided in commonly owned, copending applications Ser. Nos. 08/993,745 and 08/995,130 both of which are incorporated herein by reference.

Generally, the sensing circuitry can be configured to monitor the phase conductive path 410 (FIG. 22) at either the line side of the conductive path, the load side of the conductive path or at both the line and load sides of the conductive path. The sensing circuitry can also be configured to implement many of the various techniques capable of monitoring one or more conductive paths and determining whether signals on a conductive path comprise an arc fault. Similar to the above described GFCI circuit breaker embodiment, the sensing circuitry also operates to interrupt the AC power on at least the phase conductive path by opening contacts 226 and 228 (Seen in FIG. 13) via the actuation of solenoid 258.

In the embodiment of FIG. 22, the conductive path 410 extends from line power connection 212 to load power connection 214 via the power control assembly 224, the trip/reset assembly 240 and transformer assembly 430.

The following is a description of an exemplary embodiment of the sensing circuitry contemplated by the present application. Referring to FIG. 22, the sensing circuitry includes a path control portion 411, a pickup portion 412 and a processing portion 414. The path control portion 411 provides power to the circuitry used to detect arc faults and to the components used to open the conductive path if an arc fault is detected. The pickup portion 412 monitors the conductive path 410 and picks up spurious signals from the conductive path, which may include arc faults. The processing portion 414 receives the arcing signals and 1) determines whether the arcing signals include an arc fault, and 2) provides a trigger signal to open the conductive path if an arc fault is detected.

Referring to FIG. 23 an exemplary schematic diagram for the path control and pickup portions 411 and 412 is shown. In this embodiment, the path control portion 411 includes a power supply circuit 418 connected to the line phase and neutral connections 212 and 216 respectively, and an SCR 422 that selectively energizes solenoid 258. The power supply also provides power, typically 26 volts, to the processing circuitry through voltage dropping resistor 417 and capacitor 419, shown in FIG. 23. Capacitor 423 prevents voltage spikes on the line from causing the SCR 422 to inadvertently trigger, and resistor 425 prevents the gate of the SCR 422 from floating and ensures that the SCR turns off when the TRIG__AFCI signal (described below) goes away. Resistor 427 is used to drop the voltage from the TRIG__AFCI signal to a level suitable for the SCR 422.

The pickup portion 412 includes transformer assembly 430 which picks up spurious signals, which may include arc faults, on the conductive path 410. However, the spurious signals can also be detected using capacitive coupling via capacitors coupled to the conductive path 410. Techniques of using capacitive coupling onto the AC line to detect spurious voltage signals are known and can be used instead of the transformer assembly 430. The transformer assembly 430 includes a magnetic core 431 and a coil 432 constructed using, for example, known toroidal ferrite design techniques. Preferably, the ferrite material and the turn ratio of the magnetic core 431 and coil 432 are chosen to achieve a natural resonance at about 1.5 MHz. A resistor 434 in combination with capacitor 436 form a resonance damping network for broadband frequency pickup. This configuration enables the sensing circuitry to react to a wider range of spurious signals from different sources rather than limiting the sensing circuitry to detecting signals within a limited frequency spectrum.

The signal generated by transformer assembly 430 is transferred to capacitor 438 which performs a DC decoupling function, and diodes 440, 442 prevent low level signals below about 0.6 V peak to peak from entering the processing circuitry. The signal output by the pickup portion 412 is identified as an arcing signal, labeled ARC__SENSE, and is transferred to the processing portion 414. As noted, the processing portion determines whether the spurious signal, ARC__SENSE, includes characteristics that qualify as an arc fault.

A schematic diagram illustrating the processing circuitry 414 is shown in FIG. 24. The processing circuit 414 includes an amplifier 450, a filter 452, a rectifier 454, and a peak detector 456.

The amplifier 450 includes a resistor divider network that includes resistors 458 and 460 which determine the maximum dynamic range of the amplifier 450. The amplifier 450 also includes an operational amplifier (op amp) 462 having a fixed gain provided by resistors 464 and 466. The plus input of the op amp 462 is tied to ground potential by resistor 468, and the minus input to the op amp 462 is connected to the junction of resistors 464 and 466, as shown in FIG. 24.

The output of the op amp 462 is input to frequency selective circuitry, such as filter 452. Preferably, the filter 452 is a $2^{nd}$ order Butterworth high pass active filter, which provides better cut off response than passive filters. However, passive type filter designs, such as LC filters, can also be used. The filter 452 includes an op amp 470 connected to an RC network including capacitors 472, 474 and resistors 476, 478, 480, which perform the filtering function. Utilizing capacitors and resistors in conjunction with the op amp 470 provides a steeper roll off in frequency gain below 500 KHz than would be achieved with passive components alone. Preferably, the internal operating characteristics of the op amp 470 provide the upper limit to the high frequencies passed by the filter 452. To permit maximum utilization of the high frequency characteristics of the op amp 470, the gain of the op amp is preferably set at unity. Filter 452 permits the detection of arc faults even if the AC power lines (including the conductive path) are being used for data communications which typically occur at frequencies below 500 KHz.

The output of the filter 452 is input to the rectifier 454 which is preferably a full wave rectifier. The rectifier 454 includes an op amp 482 having its plus input connected to ground and its minus input connected to its feedback path. The rectifier 454 provides a variable level of gain, depending on whether the input signal from the filter 452 is positive or negative. To illustrate, for positive input signals the gain is zero and for negative signals the gain is determined by the ratio of resistors 484 and 486. If the input signal is positive relative to ground, the output of the op amp 482 is negative which pulls the minus input of the op amp down through diode 488 until it is equal to the plus input. Thus, the amplifier has a gain of zero. If, on the other hand, the signal input to the minus input is negative relative to ground, the output of the op amp 482 is positive and feedback current flows through diode 490 and resistor 486.

The signal output from the rectifier 454 is in the form of a pulsed DC voltage, which is fed to the peak detector 456. The peak detector 456 has a constant current source that includes op amp 492, diode 494 and resistors 496, 498 and 499. The constant current source is responsive to the pulsed DC voltage from the rectifier 454, and provides a linear charging curve across capacitor 500. The rate of charging of the capacitor 500 is proportional to the number of positive signals input to the peak detector from the rectifier 454.

As shown in FIG. 24, capacitor 500 is continually being discharged through resistor 502. In addition, the peak detector 456 functions as an integrator and a time delay circuit which aids in preventing the circuit from reacting to acceptable short lived arcing spikes created when, for example, a switch is thrown or an appliance is plugged in.

The arcing signals being detected by the processing circuitry 414 can be categorized into three main types: high, low and very low arcing signals. In the presence of a high arcing signal, the output of the rectifier 454 includes a substantial number of DC pulses so that the current output by the constant current source rapidly charges the capacitor 500 causing the voltage across the capacitor to reach a zener diode breakdown voltage of output transistor 504 relatively quickly.

When the signal detected is a low arcing signal, the peak detector 456 generates pulses that are more dispersed, causing the voltage across capacitor 500 to rise more slowly, thus delaying the breakover of the zener diode breakdown voltage of transistor 504. In this instance, although resistor 502 continuously discharges the capacitor 500, if the pulses from the rectifier 454 continue for a sufficient enough time to completely charge the capacitor 500, breakover of the zener diode breakdown voltage of transistor 504 can occur.

When the signal detected is a very low arcing signal, the discharge rate of the capacitor 500 via resistor 502 is greater than or equal to the charging rate of the capacitor 500. Thus, the voltage across the capacitor 500 does not reach a sufficiently high level to cause breakover of the zener diode breakdown voltage of transistor 504.

The output of transistor 504, labeled TRIG_AFCI, is the trigger signal for the SCR 422 (seen in FIG. 23). Thus, the TRIG_AFCI signal is input to the gate of the SCR 422 through resistor 427 which turns on the SCR and thus energizes the solenoid 258. As described above, energization of the solenoid 258 causes the contacts 226 and 228 to open or permits resetting of the circuit breaker. The solenoid 258 is de-energized after the gate signal is removed and the rectified AC decreases to a level close to zero. As noted, resistor 425 ensures that the gate of the SCR 422 turns off when there is no TRIG_AFCI signal. It should be noted that if an arc is upstream from the circuit breaker, opening the contacts stops the pickup portion from picking up spurious signals (including the arc). If the arc is downstream from the circuit breaker, opening the contacts extinguishes the arc and, thus, removes the TRIG_AFCI signal.

The operation of the AFCI circuit breaker is similar to the operation of the GFCI circuit breaker described above with reference to FIGS. 13–18. In operation, the actuator 220 is movable between 'on', 'off' and 'trip' positions, where the 'trip' position is typically between the 'on' and 'off' positions. To put the circuit breaker in the 'on' position (from the 'off' position, FIG. 17) the actuator 220 of the power control assembly 224 is moved in the direction of arrow O. When in the 'on' position (FIG. 13), the conductive path between the line and load connections is closed, the control arm catch 256 is releasably latched to the latch arm 248, as seen in FIG. 13, and the reset enable switch assembly 270 is in its normal state. At this point the circuit breaker is in the 'on' state, where the arc fault protection is armed and the breaker is capable of tripping.

If an arc fault is detected by the sensing circuitry described above for FIGS. 22–24, the solenoid 258 is energized so that the solenoid piston 262 retracts, causing the latch arm linkage 260 to pull the latch arm 248 away from the control arm 246. Once the latch arm 248 moves far enough away from the control arm 246 the control arm catch 256 is released from the latch arm 248. After the catch 256 is released, the tension in spring 254 causes the control arm 246 to pivot in the direction of arrow P permitting arm 230 to pivot in a direction P' causing contacts 226, 228 to open and the actuator 220 to automatically move to the 'trip' position, seen in FIG. 14. At this time, the circuit breaker is in the 'tripped' state.

When the circuit breaker is in the 'tripped' state, the reset lockout portion of the breaker is enabled, as seen in FIG. 14, so that the circuit breaker cannot be reset, unless the circuit interrupting portion is operational to disable the reset lockout. FIG. 15 shows the control arm catch 256 (i.e., the reset lockout) in a lockout position where catch 256 is engaged with the surface 248a of the latch arm 248, thus preventing further movement of the actuator 220 toward the 'off' position.

To reset the circuit breaker, further movement of the actuator 220 in the direction of arrow F activates reset enable switch assembly 270 by closing switch 271, which is preferably a momentary switch. Closing switch 271 triggers pulse generator 273 which outputs a pulse that turns on oscillator 275 for a finite period of time at a resonant frequency of about 1.5 MHz. An example of a suitable pulse is a 10 ms pulse at low current, e.g., in the order of about 1–10 mA. If the circuit interrupting portion is operational, activation of the reset enable switch assembly 270, which simulates a fault, energizes the solenoid 258 causing the latch arm linkage 260 and thus the latch arm 248 to retract. When the latch arm 248 retracts, the control arm catch 256 disengages from the latch arm 248 so that the actuator 220 is no longer inhibited from moving to the 'off' position, as seen in FIG. 17.

Circuit Breakers With Combined Fault Detection Capabilities

Figure 25:
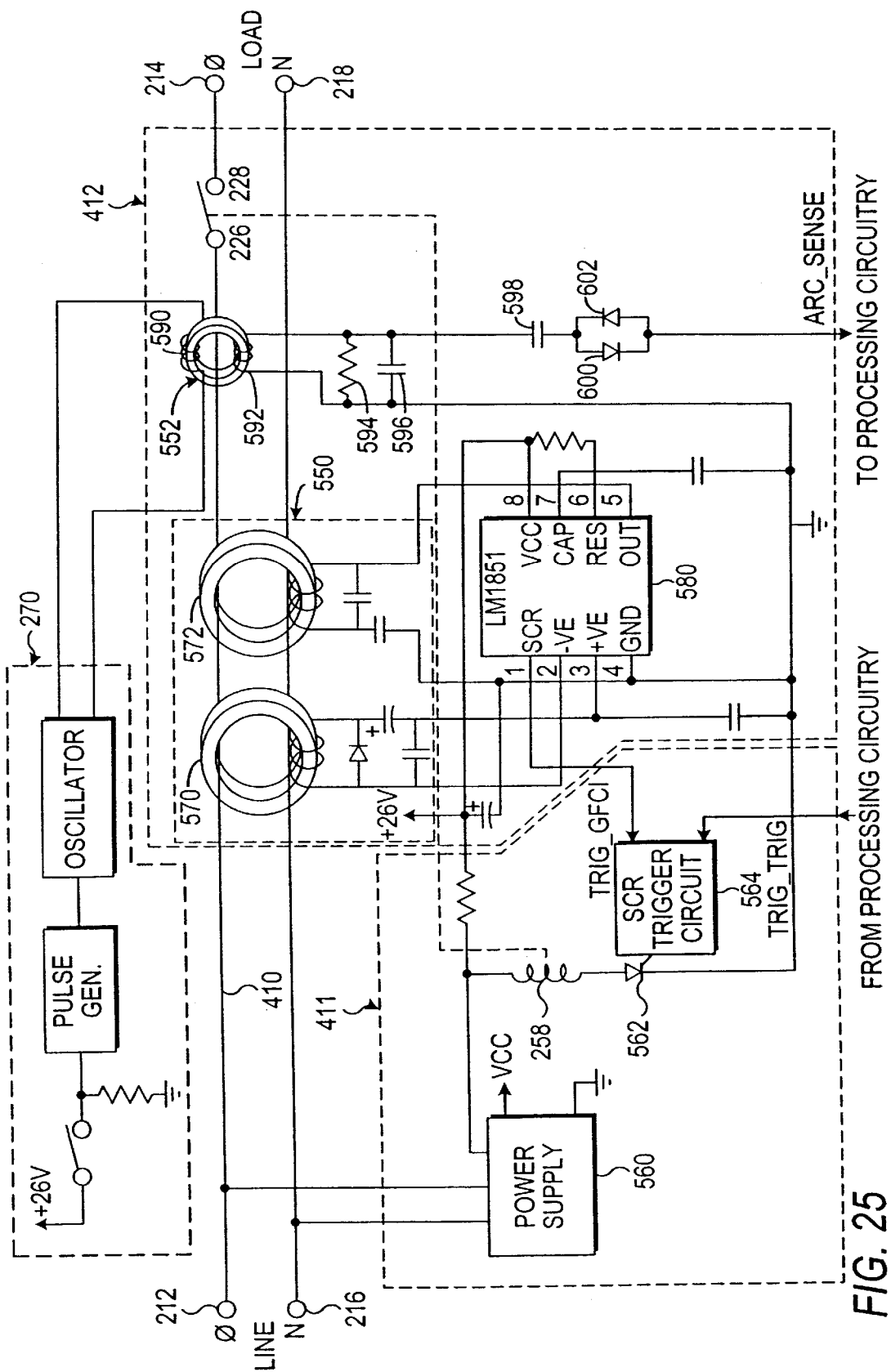
FIG. 25 is schematic diagram of the monitoring/interrupting circuitry for a circuit breaker with combined fault detection capabilities, illustrating circuitry capable of monitoring ground faults and circuitry capable of monitoring arc faults.
Figure 26:
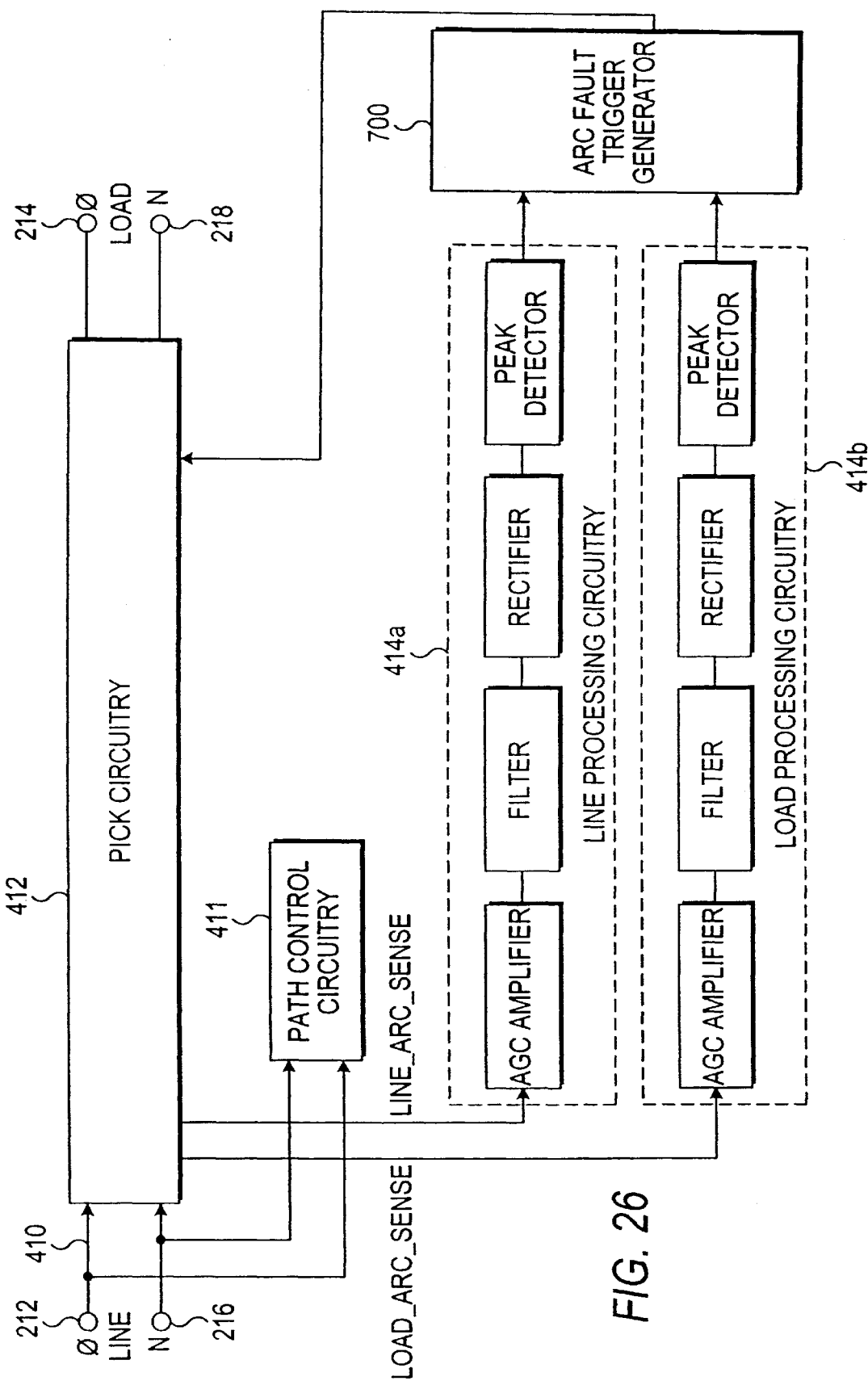
FIG. 26 is a block diagram for the fault sensing circuitry for detecting multiple types of faults.

The present application also contemplates circuit breakers that incorporate fault protection capabilities for more than one type of fault. For example, the circuit breaker can be configured with ground fault and arc fault protection, or the circuit breaker can be configured with ground fault and immersion detection fault protection. The construction of such circuit breakers can be similar to that shown in FIGS. 12–18 and for simplicity is not repeated. That is, such circuit breakers would include a circuit interrupting portion, a reset portion, a reset lockout portion and, optionally, an independent trip portion. A difference in such combined fault protection circuit breakers would be in the sensing circuitry used to detect faults. The block diagram of FIG. 22 in combination with the schematic diagram of FIG. 25 show the sensing circuitry for one embodiment for a circuit breaker having ground fault and arc fault protection capabilities. FIGS. 26–30 show sensing circuitry for another embodiment for a circuit breaker having ground fault and arc fault protection capabilities. These embodiments are exemplary. The present application contemplates circuit breakers with any number of fault protection capabilities in any combination.

The following description of FIG. 25 is an exemplary embodiment of sensing circuitry suitable for use in a circuit breaker with combined fault protection capabilities. In this embodiment, the conductive path 410 extends from line power connection 212 to load power connection 214 via the power control assembly 224 (seen in FIG. 13), the trip/reset assembly 240 (seen in FIG. 13), transformer assembly 550 and transformer assembly 552. Generally, the sensing circuitry includes a path control portion 411, a pickup portion 412 and a processing portion 414 (seen in FIG. 24) similar to the embodiment of FIG. 22. The path control portion 411 provides power to the circuitry used to detect ground faults and arc faults, and to the components used to open the conductive path if a ground fault or an arc fault is detected. The pickup portion 412 monitors the conductive path 410 and picks up 1) ground faults and grounded neutral faults, and 2) spurious signals from the conductive path which may include arc faults. The processing portion 414 (seen in FIG. 24) receives arcing signals from the pick up portion and 1) determines whether the spurious signals include an arc fault, and 2) provides a trigger signal to open the conductive path if an arc fault is detected. In this embodiment, the processing portion 414 is the same as the processing portion 414 described above with reference to FIG. 24 and is not repeated.

Referring again to FIG. 25, the path control portion 411 includes a power supply circuit 560 connected to the line phase and neutral connections 212 and 216 respectively, SCR 562 and SCR trigger circuit 564. The power supply provides power, typically rectified AC, to the SCR 562, and provides power, typically 26 volts, to the components in the pickup and processing portions 412 and 414, and to the GFCI portion. The solenoid 258 is selectively energized in response to the output of SCR trigger circuit 564, which results in the opening and/or closing of contacts 226 and 228. Preferably, the SCR trigger circuit 564 performs an OR function so that either a ground fault or an arc fault trigger signal triggers the SCR 562.

The pickup portion 412 includes a ground fault pickup and an arc fault pickup. The ground fault pick up includes transformer assembly 550 having a differential transformer 570 and a ground neutral transformer 572 both coupled to an integrated circuit 580. The integrated circuit 580 is used to detect ground faults and to output a trigger signal, labeled TRIG_GFCI, to the SCR trigger circuit 564. Examples of suitable integrated circuits include the National Semiconductor LM1851 and the Raytheon RA9031. As noted above, such ground fault sensing circuitry is known.

The arc fault pickup includes transformer assembly 552 which picks up spurious current signals, which may include arc faults, on the conductive path. However, spurious voltage signals can also be detected using capacitive coupling via capacitors coupled to the phase conductive path. Techniques of using capacitive coupling onto the AC line are known.

The transformer assembly 552 has a magnetic core 590 and a coil 592 constructed using, for example, known toroidal ferrite design techniques. Preferably, the ferrite material and the turn ratio of the magnetic core 590 and coil 592 are chosen to achieve a natural resonance at about 1.5 MHz. A resistor 594 in combination with capacitor 596 forms a resonance damping network for broadband frequency pickup. This configuration of the arc fault pickup enables the sensing circuitry to react to a wider range of spurious signals from different sources rather than limiting the sensing circuitry to detecting signals within a limited frequency spectrum.

The signal generated by transformer assembly 552 is transferred to capacitor 598 which performs a DC decoupling function, and diodes 600, 602 prevent low level signals below about 0.6 V peak to peak from entering the processing circuitry 414. The signal output by the pickup portion is identified as an arcing signal, labeled ARC_SENSE, and is transferred to the processing portion 414. As noted, the processing portion determines whether the spurious signal includes characteristics that qualify it as an arc fault.

The operation of the circuit breaker with combined fault protection capabilities according to the embodiment of FIGS. 22 and 25 is similar to the operation of the GFCI and AFCI circuit breakers described above with reference to FIGS. 13–24, except that it is responsive to the detection of one or more types of faults.

In operation, the actuator 220 (seen in FIG. 17) is movable between 'on', 'off' and 'trip' positions, where the 'trip' position is typically between the 'on' and 'off' positions. To put the circuit breaker in the 'on' position (from the 'off' position, FIG. 17) the actuator 220 of the power control assembly 224 is moved in the direction of arrow O. When in the 'on' position (FIG. 13), the conductive path between the line and load connections is closed, the control arm catch 256 is releasably latched to the latch arm 248, as seen in FIG. 13, and the reset enable switch assembly 270 is in its normal state. At this point the circuit breaker is in the 'on' state, where fault protection is armed and the breaker is capable of tripping.

If a fault (e.g., an arc fault or a ground fault) is detected by the sensing circuitry described above for FIGS. 22 and 25, the solenoid 258 is energized so that the solenoid piston 262 retracts, causing the latch arm linkage 260 to pull the latch arm 248 away from the control arm 246. Once the latch arm 248 moves far enough away from the control arm 246 the control arm catch 256 is released from the latch arm 248. After the catch 256 is released, the tension in spring 254 causes the control arm 246 to pivot in the direction of arrow P' permitting arm 230 to pivot in a direction P causing contacts 226, 228 to open and the actuator 220 to automatically move to the 'trip' position, seen in FIG. 14. At this time, the circuit breaker is in the 'tripped' state.

When the circuit breaker is in the 'tripped' state, the reset lockout portion of the breaker is enabled, as seen in FIG. 14, so that the circuit breaker cannot be reset, unless the circuit interrupting portion is operational to disable the reset lockout. FIG. 15 shows the control arm catch 256 (i.e., the reset lockout) in a lockout position where catch 256 is engaged with the surface 248a of the latch arm 248, thus preventing further movement of the actuator 220 toward the 'off' position.

To reset the circuit breaker, further movement of the actuator 220 (seen in FIG. 16) in the direction of arrow F activates reset enable switch assembly 270 (seen in FIG. 25) by closing switch 271, which is preferably a momentary switch. Closing switch 271 triggers pulse generator 273 which outputs a pulse that turns on oscillator 275 for a finite period of time at a resonant frequency of about 1.5 MHz. An example of a suitable pulse is a 10 ms pulse at a low current, e.g., in the order of about 1–10 mA. If the circuit interrupting portion is operational, activation of the reset enable switch assembly 270, which simulates a fault, energizes the solenoid 258 causing the latch arm linkage 260 and thus the latch arm 248 to retract. When the latch arm 248 retracts, the control arm catch 256 disengages from the latch arm 248 so that the actuator 220 is no longer inhibited from moving to the 'off' position, as seen in FIG. 17.

It should be noted that in the embodiment of FIG. 25, the GFCI portion is not activated for reset. However, it may be desirable to activate test circuits for both the GFCI and AFCI portions of the device, so that when resetting the device, both portions are tested before the device is reset. A description of this embodiment is described within the embodiment below.

It may be desirable for the sensing circuitry to generally pinpoint the location of an arc fault within a branch circuit. To accomplish this, a second arc fault pickup is added to the pickup portion 412, shown in FIG. 25, so that the pickup portion 412 outputs two separate arcing signals representing arcing signals picked up on the line and load sides. This embodiment of the sensing circuitry is shown in FIGS. 26–30.

Figure 27:
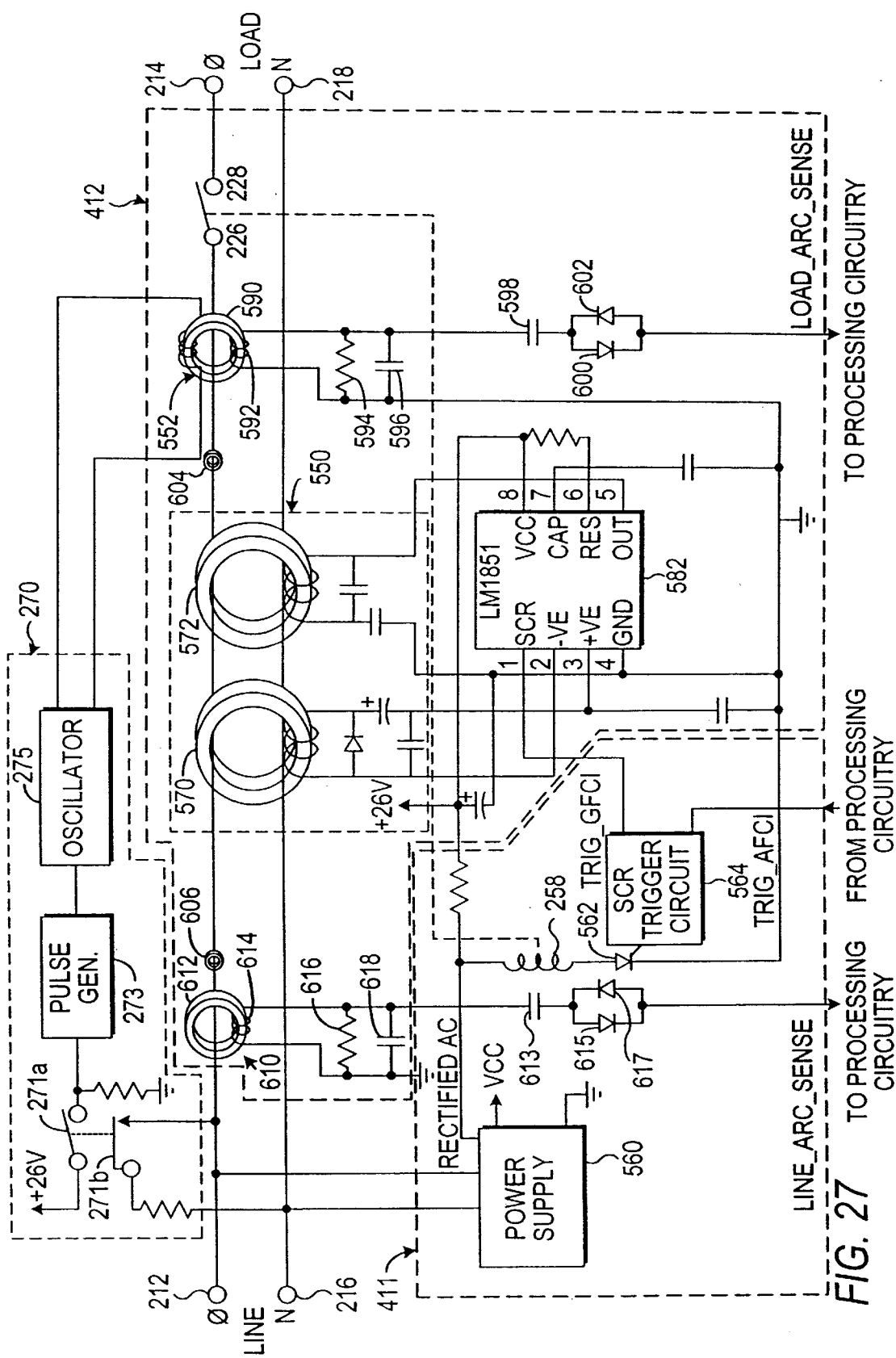
FIG. 27 is schematic diagram of the monitoring/interrupting circuitry for a circuit breaker with combined fault detection capabilities, illustrating circuitry capable of monitoring ground faults and circuitry capable of monitoring arc faults at both the line side and the load side.

In this embodiment, the AC line (i.e., the line phase and neutral conductive paths) is partitioned into two different segments separated by the ground fault pickup of the pickup portion 412. The AC line is split for high frequency signals while the normal 50 or 60 Hz power transmission is unaffected. Referring to FIG. 27, the line and load arc fault pickups are, preferably, separated by the transformer assemblies 570 and 572 and ferrite transformers or beads 604 and 606 located on each side of the transformer assemblies. The ferrite transformers function to enhance the impedance of the AC line to high frequency signals.

The line side arc fault pickup includes transformer assembly 610 having a magnetic core 612 and a coil 614. The magnetic core 612 and coil 614 are constructed using, for example, known toroidal ferrite design techniques. Preferably, the ferrite material and the turn ratio of the magnetic core 612 and coil 614 are chosen to achieve a natural resonance at about 1.5 MHz. A resistor 616 in combination with capacitor 618 form a resonance damping network for broadband frequency pickup. This configuration enables the sensing circuitry to react to a wider range of spurious signals from different sources rather than limiting the sensing circuitry to detecting signals within a limited frequency spectrum. The load side pickup is the same as the arc fault pickup described above with reference to FIG. 25 and for simplicity is not repeated.

Similar to the above-described embodiments, the arcing signal can also be detected using capacitive coupling via capacitors on both the line side pickup and the load side pickup. Techniques of using capacitive coupling onto the AC line are known.

Figure 28:
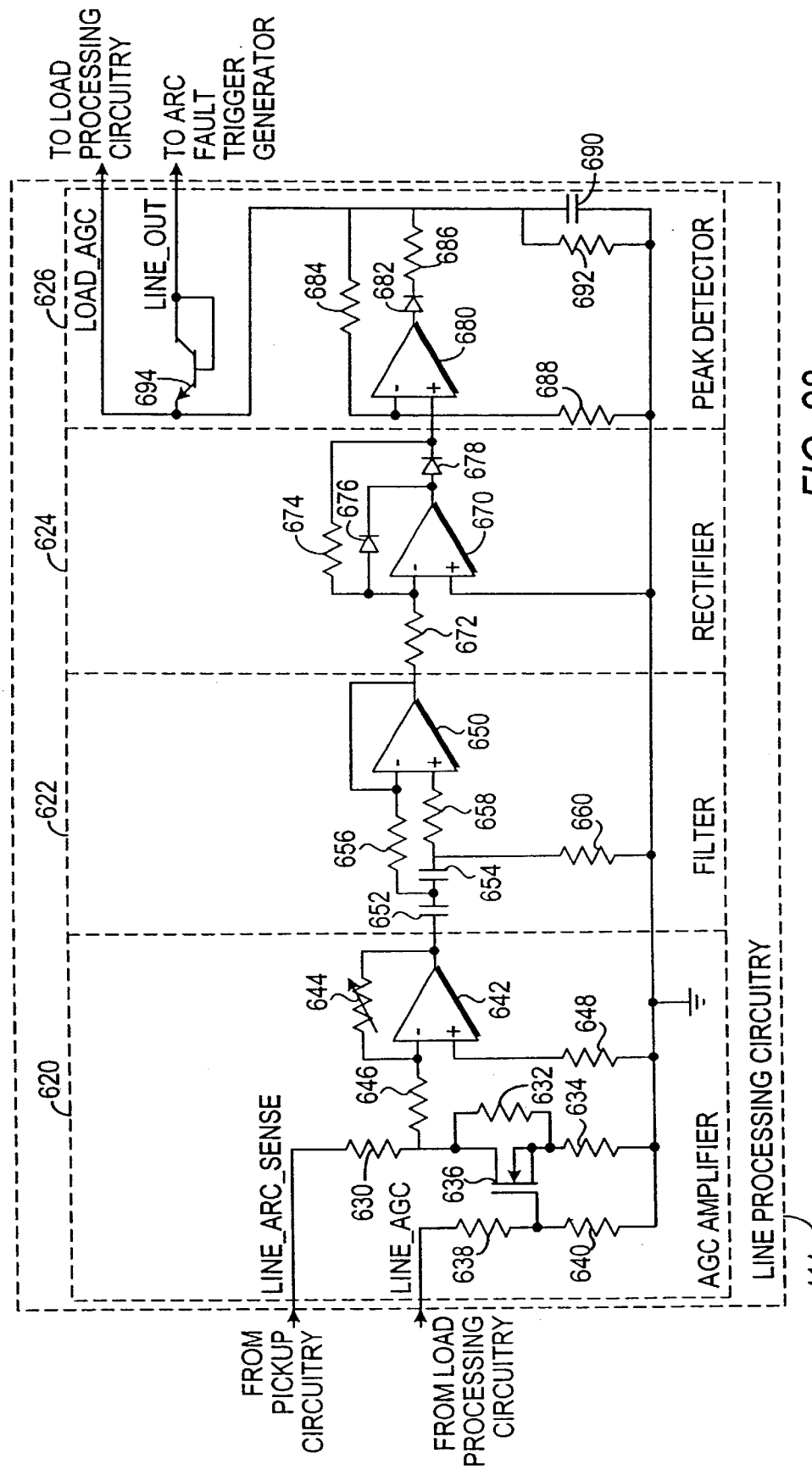
FIG. 28 is a schematic diagram of the processing circuitry for detecting arc faults on the line side of the fault sensing circuitry of FIG. 26.
Figure 29:
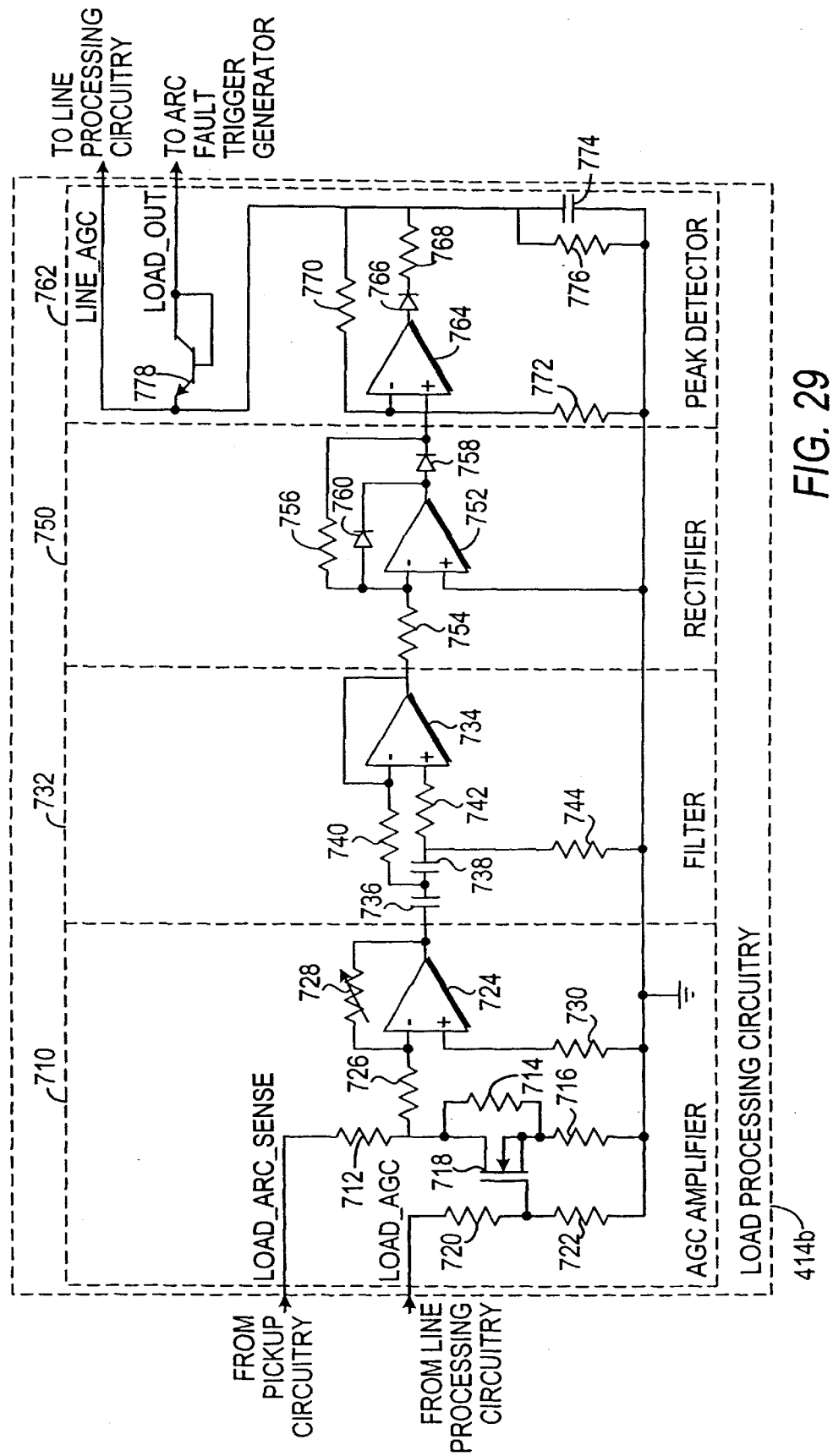
FIG. 29 is a schematic diagram of the processing circuitry for detecting arc faults on the load side of the fault sensing circuitry of FIG. 26.

Schematic diagrams illustrating the line processing circuitry 414a and the load processing circuitry 414b are shown in FIGS. 28 and 29, respectively. In this embodiment each processing circuit includes four processing stages; an AGC amplifier, a filter, a rectifier and a peak detector.

Referring to FIG. 28, in the line processing circuitry 414a, the LINE_ARC_SENSE signal is fed into the AGC amplifier 620, which includes a first resistor divider network having resistors 630, 632 and 634 that determine the maximum dynamic range of the AGC amplifier 620. Feedback control is provided through field effect transistor (FET) 636, which acts as a variable resistance in parallel with resistor 632. A second resistor divider network that includes resistors 638 and 640 provides a voltage level for the gate of FET 636. Preferably, a feedback signal, labeled LINE_AGC, input to FET 636 is proportional to a signal level developed on the load side. Similarly, a feedback signal, labeled LOAD_AGC, fed back to the AGC amplifier in the load circuitry (described hereinbelow in connection with FIG. 29) is preferably proportional to the signal level developed on the line side. This configuration provides additional differentiation between the line side and load side arcing signals sensed by the arc fault pickup.

The AGC amplifier 620 also includes an operational amplifier (op amp) 642 having a fixed gain provided by resistors 644 and 646. Resistor 644 is preferably a variable resistor that permits matching of the base gain of the AGC amplifier in both the line processing circuitry 414a and the load processing circuitry 414b. The plus input of the op amp 642 is connected to ground by resistor 648, and the minus input of the op amp is connected to resistors 644 and 646 as shown. To illustrate the effect of the feedback of the FET 636, assume that resistors 630, 632 and 634 are equal. With no feedback on the LINE_AGC signal, FET 636 is an open circuit and 67% of the LINE_ARC_SENSE signal enters op-amp 642. With full feedback on the LINE_AGC, the FET 636 is saturated so that only 50% of the LINE_ARC_SENSE signal enters the op-amp 642. By altering the values of resistors 630, 632 and 634 and resistors 638 and 640, the weight and responsiveness of the AGC amplifier can be varied.

The output of the op amp 642 is input to frequency selective circuitry, such as filter 622. Preferably, the filter 622 is a $2^{nd}$ order Butterworth high pass active filter, which provides better cut off response than passive filters. However, passive type filter designs, such as LC filters, can also be used.

Preferably, the filter 622 includes an op amp 650 connected to an RC network including capacitors 652, 654 and resistors 656, 658, 660 which perform the filtering function. Utilizing capacitors and resistors in conjunction with the op amp 650 provides a steeper roll off in frequency gain below 500 KHz than would typically be achieved with passive components alone. Preferably, the internal operating characteristics of the op amp 650 provide the upper limit to the high frequencies passed by the filter 622. To permit maximum utilization of the high frequency characteristics of the op amp 650, the gain of the op amp is preferably set at unity. Filter 622 permits the detection of arc faults even if the AC power lines (including the conductive path) are being used for data communications which typically occur at frequencies below 500 KHz.

The output of the filter 622 is input to the rectifier 624, which is preferably a full wave rectifier. Preferably, the rectifier 624 is configured to rectify input voltages in the millivolt range, and to provide a DC voltage for the peak detectors 626. The rectifier 624 includes an op amp 670 having its plus input connected to ground and its minus input connected to its feedback path. The rectifier 624 provides a variable level of gain, depending on whether the input signal from the filter 622 is positive or negative. To illustrate, for positive input signals the gain is zero, and for negative signals the gain is preferably determined by the ratio of resistors 672 and 674. If the input signal is positive relative to ground, the output of the op amp 670 is negative which pulls the minus input of the op amp down through diode 676 until it is equal to the plus input. Thus, the op amp 670 has a gain of zero. If, on the other hand, the signal input to the minus input is negative relative to ground, the output of the op amp 674 is positive and feedback current flows through diode 678 and resistor 674 and the gain is set by resistors 672 and 674.

The signal output from the rectifier 624 is in the form of a pulsed DC voltage, which is fed to the peak detector 626. The peak detector 626 has a constant current source that includes op amp 680, diode 682 and resistors 684, 686 and 688. The constant current source is responsive to the pulsed DC voltage from the rectifier 624 and provides a linear charging curve across capacitor 690. The rate of charging of the capacitor 690 is proportional to the number of positive signals input to the peak detector 626 from the rectifier 624.

As shown in FIG. 28, capacitor 690 is continually being discharged through resistor 692. In addition, the peak detector 626 functions as an integrator and a time delay circuit which aids in preventing the circuit from reacting to acceptable short lived arcing spikes created when, for example, a switch is thrown or an appliance is plugged in.

The arcing signals being detected by the processing circuitry 414a can be categorized into three main types: high, low and very low arcing signals. In the presence of a high arcing signal, the output of the rectifier 624 includes a substantial number of DC pulses so that the current output by the constant current source rapidly charges the capacitor 690 causing the voltage across the capacitor 690 to reach a zener diode breakdown voltage of output transistor 694 relatively quickly.

When the signal detected is a low arcing signal, the peak detector 626 generates pulses that are more dispersed, causing the voltage across capacitor 690 to rise more slowly, thus delaying the breakover of the zener diode breakdown voltage of transistor 694. In this instance, although resistor 692 continuously discharges the capacitor 690, if the pulses from the rectifier 624 continue for a sufficient enough time to completely charge the capacitor 690, breakover of the zener diode breakdown voltage of transistor 694 can occur.

When the signal detected is a very low arcing signal, the discharge rate of the capacitor 690 via resistor 692 is greater than or equal to the charging rate of the capacitor 690. Thus, the voltage across the capacitor 690 does not reach a sufficiently high level to cause breakover of the zener diode breakdown voltage of transistor 694.

The output of transistor 694, labeled LINE_OUT, is input to arc fault trigger generator 700 (seen in FIG. 30), which as described below provides the trigger signal for the SCR 562 causing the solenoid 258 to be energized and contacts 226 and 228 to open or permits resetting of the circuit breaker. Further, the output voltage of peak detector 626, designated LOAD_AGC, is used as the feedback signal for the AGC amplifier in the load processing circuitry 414b.

Referring now to FIG. 29 the load processing circuitry 414b is shown. In the load processing circuitry, the LOAD_ARC_SENSE signal is fed into an AGC amplifier 710 having a first resistor divider network that includes resistors 712, 714 and 716, and determines the maximum dynamic range of the AGC amplifier 710. Feedback control is provided through field effect transistor (FET) 718, which acts as a variable resistance in parallel with resistor 714. A second resistor divider network that includes resistors 720 and 722 provides a voltage level for the gate of FET 718. As noted, preferably, a feedback signal, labeled LOAD_AGC, input to FET 718 is preferably proportional to the LINE_AGC feedback signal level developed on the load side.

The AGC amplifier 710 also includes op amp 724 having a fixed gain provided by resistors 726 and 728. The plus input of the op amp 724 is connected to ground via resistor 730, and the minus input of the op amp 724 is connected to resistors 726 and 728 as shown.

The output of the op amp 724 is input to frequency selective circuitry, such as filter 732. Similar to the line processing circuitry the filter 732 is preferably a $2^{nd}$ order Butterworth high pass active filter, which provides better cut off response than passive filters. However, passive type filter designs, such as LC filters, can also be used.

Preferably, the filter 732 includes an op amp 734 connected to an RC network including capacitors 736, 738 and resistors 740, 742, 744 which perform the filtering function. Utilizing capacitors and resistors in conjunction with the op amp 734 provides a steeper roll off in frequency gain below 500 KHz than would be achieved with passive components alone. Preferably, the internal operating characteristics of the op amp 734 provide the upper limit to the high frequencies passed by the filter 732. To permit maximum utilization of the high frequency characteristics of the op amp 734, the gain of the op amp is preferably set at unity. Filter 732 permits the detection of arc faults even if the AC power lines (including the conductive path) are being used for data communications which typically occur at frequencies below 500 KHz.

The output of the filter 732 is input to the rectifier 750, which is preferably a full wave rectifier. Preferably, the rectifier 750 is configured to rectify input voltages in the millivolt range, and provides a DC voltage for the peak detector 762. The rectifier 750 includes an op amp 752 having its plus input connected to ground and its minus input connected to its feedback path. The rectifier portion provides a variable level of gain, depending on whether the input signal from the filter portion is positive or negative. To illustrate, for positive input signals the gain is zero, and for negative signals, the gain is determined by the ratio of resistors 754 and 756. If the input signal is positive relative to ground, the output of the op amp 752 is negative which pulls the minus input of the op amp down through diode 760 until it is equal to the plus input. Thus, the amplifier has a gain of zero. If, on the other hand, the signal input to the minus input is negative relative to ground, the output of the op amp 752 is positive and feedback current flows through diode 758 and resistor 756 and the gain is set by resistors 754 and 756.

The signal output from the rectifier 750 is in the form of a pulsed DC voltage, which is fed to the peak detector 762. The peak detector 762 has a constant current source that includes op amp 764, diode 766 and resistors 768, 770 and 772. The constant current source is responsive to the pulsed DC voltage from the rectifier 750, the output of which provides a linear charging curve across capacitor 774. Similar to the line processing circuitry 414a, the rate of charging of capacitor 774 is proportional to the number of positive signals input to the peak detector portion from the rectifier 750.

As seen in FIG. 29, capacitor 774 is continually being discharged through resistor 776. In addition, the peak detector 762 functions as an integrator and a time delay circuit which aids in preventing the circuit from reacting to acceptable short lived arcing spikes created when, for example, a switch is thrown or an appliance is plugged in.

The arcing signals being detected by the processing circuitry 414b can be categorized into three main types:

high, low and very low arcing signals. In the presence of a high arcing signal, the output of the rectifier 750 includes a substantial number of DC pulses so that the current output by the constant current source rapidly charges the capacitor 774 causing the voltage across the capacitor to reach a zener diode breakdown voltage of output transistor 778 relatively quickly.

When the signal detected is a low arcing signal, the peak detector 762 generates pulses that are more dispersed, causing the voltage across capacitor 774 to rise more slowly, thus delaying the breakover of the zener diode breakdown voltage of transistor 778. In this instance, although resistor 776 continuously discharges the capacitor 774, if the pulses from the rectifier 750 continue for a sufficient enough time to completely charge the capacitor 774, breakover of the zener diode breakdown voltage of transistor 778 can occur.

When the signal detected is a very low arcing signal, the discharge rate of the capacitor 774 via resistor 776 is greater than or equal to the charging rate of the capacitor 774. Thus, the voltage across the capacitor 774 does not reach a sufficiently high level to cause breakover of the zener diode breakdown voltage of transistor 778.

The output of transistor 778, labeled LOAD_OUT, is input to the arc fault trigger generator 700, which as described above, will trigger the SCR 562 causing the solenoid 258 to be energized and contacts 226 and 228 to open or permits resetting of the circuit breaker.

As noted, the output voltage of peak detector 762, designated LINE_AGC, is used as the feedback signal for the AGC amplifier 620 in the line processing circuitry 414*a*.

Figure 30:
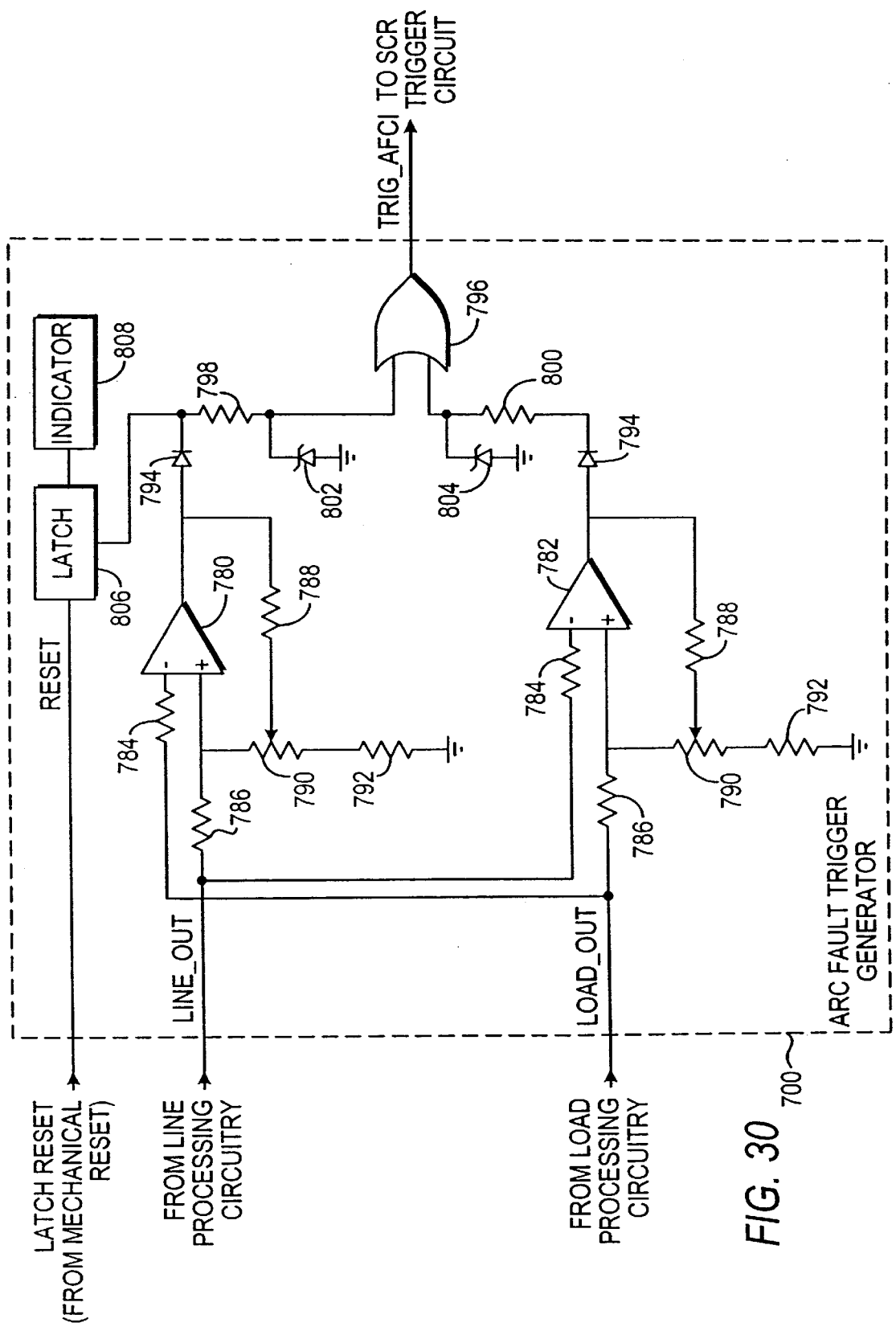
FIG. 30 is a schematic diagram for the arc fault trigger generator for the fault sensing circuitry of FIG. 26.

Referring to FIG. 30, the arc fault trigger generator 700 of the present application will now be described. Once the output signals from the line processing circuitry (LINE_OUT) and the load processing circuitry (LOAD_OUT) exceed their relative zener diode breakdown voltages, they are fed simultaneously into comparators 780 and 782. The two comparator circuits are similar in construction and like components will be designated with the same reference numerals.

Resistors 784 and 786 provide input resistance to the respective comparator 780 or 782, while resistor 788 provides feedback and resistors 790 and 792 provide adjustable hysteresis for each respective comparator. The output of each comparator 780 and 782 is rectified by a diode 794. In one configuration shown in FIG. 30, the rectified output of each comparator can be converted to a logic "1" or "0" by resistors 798 and 800 and zener diodes 802 and 804 and input to an OR function 796. The output of the OR function 796 would be the arc fault trigger signal, labeled TRIG_AFCI, input to the SCR trigger circuit 564. In addition, the rectified output of comparator 780 can be used to provide, for example, a visual or audible indication via latch 806 and indicator 808 that a sensed arc fault occurred on the line side.

In another configuration, the rectified output of comparator 780 can be used to provide, for example, a visual or audible indication via indicator 808 that a sensed arc fault occurred on the line side. While, the rectified output of comparator 782 can be used as the arc fault trigger signal to trip or reset the circuit breaker. In this alternative configuration, arc faults sensed on the line side would neither trip the circuit breaker nor permit resetting of the circuit breaker, but arc faults sensed on the load side would.

It should be noted that the LINE_OUT and LOAD_OUT signals are input to both comparators 780 and 782. The LINE_OUT signal is input to the plus input of comparator 780 and the minus input of comparator 782. The LOAD_OUT signal is input to the plus input of comparator 782 and the minus input of comparator 780. In this exemplary configuration, the comparators are prebiased to initially set the outputs of the comparators 780 and 782 low. Thus, if the LINE_OUT signal is greater than the LOAD OUT signal, the output of comparator 780 goes high, assuming the LINE_OUT signal is greater than the breakover voltage of transistor 694, seen in FIG. 28. If the LOAD_OUT signal is greater than the LINE_OUT signal, the output of comparator 782 goes high, assuming the LOAD_OUT signal is greater than the breakover voltage of transistor 778, seen in FIG. 29.

Therefore, if arcing occurs on the load side of the AFCI/GFCI, the signal generated at the load side pickup will be greater than the signal generated at the line side pickup due to the attenuation of high frequencies caused by the separating impedance. On the other hand, arcing occurring on the line side will generate a larger signal at the line side pickup than at the load side pickup.

In the embodiments described above, both the AFCI and GFCI fault protection capabilities operate to interrupt the AC power by opening contacts 226 and 228 via the actuation of solenoid 258. The solenoid 258 is actuated by triggering the SCR 562 via the SCR trigger circuit 564. As described above, in one embodiment, the SCR trigger circuit 564 can function to provide an OR function to trigger the SCR 562 using known thyristor triggering techniques when either of its two input trigger signals TRIG_GFCI and TRIG_AFCI go active.

When resetting the circuit breaker, the reset operation can be configured so that reset of the circuit breaker can be achieved when one of the two trigger signals, TRIG_GFCI or TRIG_AFCI, go active. In this instance, the SCR trigger circuit 564 would continue to provide the OR function.

However, if the SCR trigger circuit 564 is configured as an OR function, then one of the fault protection operations of the circuit breaker need be operational in order to reset the circuit breaker. To verify that each fault protection operation of the circuit breaker is operational when the circuit breaker is reset, a test operation for each type of fault protection should be provided.

Figure 31:
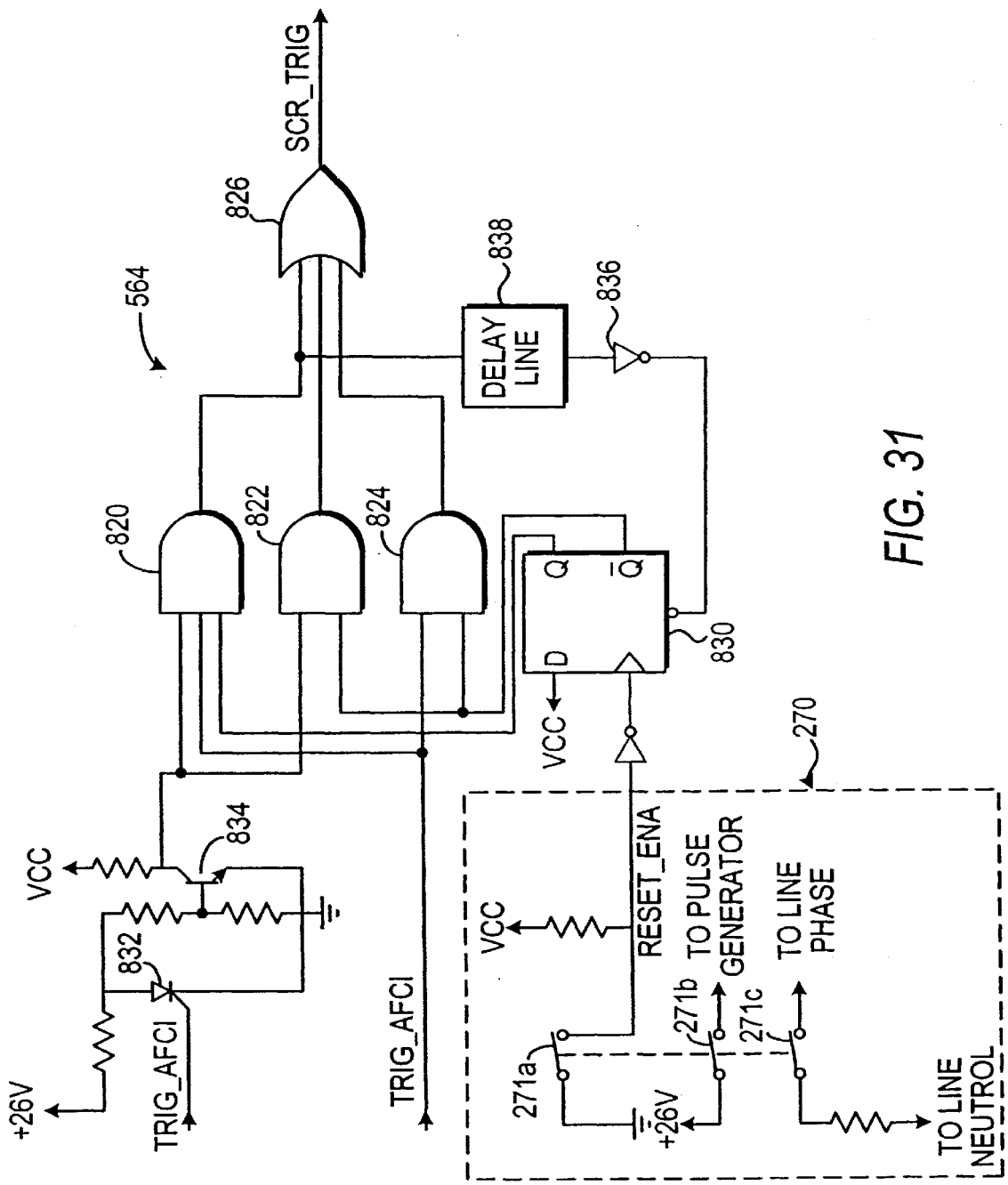
FIG. 31 is a schematic diagram of an alternative embodiment for the SCR trigger circuit.

FIG. 31 provides a schematic diagram for an SCR triggering circuit 564 that requires each triggering signal to activate before the SCR 562 is triggered and solenoid 258 is energized when resetting the circuit breaker. In this embodiment, the triggering signals, TRIG_GFCI and TRIG_AFCI, are input to AND gates 820, 822 and 824, as shown, and the output of each AND function is input to an OR gate 826. In addition, a reset enable signal, labeled RESET_ENA, generated by an additional switch in the reset enable switch assembly 270, is also input to the AND gates 820 and 822, as shown. The output of the OR gate 826 is used as the trigger signal for the gate of the SCR 562. In this exemplary configuration, when the circuit breaker is in the 'on' state and the fault protection is armed, the detection of either a ground fault or an arc fault will trigger the SCR 562 via AND gate 822 or 824 and OR gate 826. However, when resetting the circuit breaker, the RESET_ENA signal disables AND gates 822 and 824, and enables AND gates 820. Thus, only the detection of both a ground fault and an arc fault will trigger the SCR 562 via AND gate 820 and OR gate 826 when resetting the circuit breaker.

Similar to the reset operation for the above described embodiments, the circuit breaker is reset by moving the actuator 220 in the direction of arrow F (seen in FIG. 16) to activate reset enable switch assembly 270 (seen in FIG. 31) by closing switches 271*a*, 271*b* and 271*c*, which are preferably momentary switches. Closing switch 271*a* clocks latch 830 which enables AND gate 820 and disables AND gates 822 and 824. Closing switch 271b triggers pulse generator 273 which outputs a pulse that turns on oscillator 275 for a finite period of time at a resonant frequency of about 1.5 MHz. An example of a suitable pulse is a 10 ms pulse at low current, in the order of about 1–10 mA. It should be noted that the number of turns on the coil 592 on the transformer assembly 552 can be used to control the current from the transformer assembly. If the arc fault circuit interrupting portion is operational, activation of switch 271b simulates an arc fault so that the arc fault trigger signal, TRIG_AFCI, is active. Closing switch 271c simulates a ground fault so that the ground fault trigger signal, TRIG_GFCI, is active. When TRIG_GFCI goes active, SCR 832 turns on thereby turning on transistor 834 so that a logic 1 is seen by AND gate 820.

In this configuration, when the latch 830 is clocked and the TRIG_AFCI and TRIG_GFCI lines are active, AND gate 820 outputs a logic 1 which triggers the SCR 562 to energize solenoid 258.

The output of AND gate 820 is also connected to the reset input of the latch 830 via inverter 836. As a result, when AND gate 820 outputs a logic 1, latch 830 is reset, so that gate 820 is disabled and gates 822 and 824 are enabled for standard operation of the breaker. It may be desirable to include a delay line 838 (shown in phantom in FIG. 31), which provides a time delay that is sufficient to allow the mechanical components of the circuit breaker to reset before enabling AND gates 822 and 824 to avoid false triggering of the circuit breaker.

Systems Having Circuit Breakers With Reset Lockout

The circuit breakers described above can be used in electrical distribution systems in, for example, a home, shown in the exemplary block diagram of FIG. 32. The system includes a circuit breaker panel 300 used to supply electrical power to various circuits in the home, at least one GFCI circuit breaker having a reset lockout and/or independent trip portions installed in the panel, and various connection points, such as receptacles, to connect one or more loads thereto. As is well known, the line phase connection 212 of the GFCI circuit breaker is connected to a power distribution bus 302 in the panel and the load phase connection 214 is connected to the phase conductor 304 feeding one or more loads. A neutral conductor 306 to the one or more loads is connected to a load neutral connection 218 associated with the circuit breaker 200, and a line neutral conductor 216, typically, extending from the circuit breaker housing is connected to a neutral bus 308 in the panel.

While there have been shown and described and pointed out the fundamental features of the invention, it will be understood that various omissions and substitutions and changes of the form and details of the device described and illustrated and in its operation may be made by those skilled in the art, without departing from the spirit of the invention.

What is claimed:

1. A circuit breaker comprising:
 a housing having a line phase connection and load phase connection accessible from an exterior of said housing;
 a conductive path within said housing between said line and load phase connections;
 a circuit interrupting portion disposed within said housing and configured to open said conductive path upon the occurrence of a first predefined condition;
 a reset portion having an actuator extending through said exterior of said housing, wherein activation of the reset portion activates the circuit interrupting portion, and configured to close said conductive path upon actuation of said actuator; and
 a reset lockout portion, responsive to activation of the circuit interrupting portion, for preventing the closing of said conductive path if a second predefined condition exists.

2. The circuit breaker according to claim 1, wherein said first predefined condition includes a fault or an over-current condition.

3. The circuit breaker according to claim 2, wherein said fault includes a ground fault, an arc fault, an immersion detection fault, an appliance leakage fault or an equipment leakage fault.

4. The circuit breaker according to claim 1, wherein said second predefined condition includes said circuit interrupting portion being non-operational or an open neutral condition.

5. The circuit breaker according to claim 1, further comprising a trip portion disposed at least partially within said housing and configured to open said conductive path independently of said circuit interrupting portion operation.

6. The circuit breaker according to claim 5, wherein said trip portion comprises a trip actuator accessible from said exterior of said housing and a trip arm coupled to said trip actuator, said trip arm being configured to facilitate mechanical breaking of said conductive path if said trip actuator is actuated.

7. The circuit breaker according to claim 6, wherein said trip actuator comprises a pushbutton.

8. The circuit breaker according to claim 1, wherein said conductive path includes a pair of contacts wherein at least one of said pair of contacts is movable relative to the other such that said contacts can be moved between open and closed positions.

9. The circuit breaker according to claim 8, wherein said circuit interrupting portion includes sensing circuitry used to sense the occurrence of a ground fault and electromechanical linkage responsive to said sensing circuitry and used to cause said pair of contacts to open.

10. The circuit breaker according to claim 1, wherein said housing is configured and dimensioned for installation in a circuit breaker panel.

11. A circuit breaker comprising:
 a housing having line and load phase connections and line and load neutral connections accessible from an exterior of said housing;
 a conductive path within said housing and connected between said line and load phase connections;
 a circuit interrupting portion disposed within said housing and configured to cause electrical discontinuity at a point along said conductive path upon the occurrence of a first predefined condition;
 a reset portion which, upon activation, activates the circuit interrupting portion, and configured to reestablish electrical continuity in said conductive path; and
 a reset lockout portion, responsive to activation of the circuit interrupting portion, for preventing reestablishment of electrical continuity of said conductive path if a second predefined condition exists.

12. The circuit breaker according to claim 11, wherein said first predefined condition includes a fault or an over-current condition.

13. The circuit breaker according to claim 12, wherein said fault includes a ground fault, arc fault, an immersion detection fault, an appliance leakage fault or an equipment leakage fault.

14. The circuit breaker according to claim 11, wherein said second predefined condition includes said circuit interrupting portion being non-operational, or an open neutral condition.

15. The circuit breaker according to claim 11, further comprising a trip portion having a trip actuator extending through said housing and configured to activate a trip operation causing electrical discontinuity in said conductive path in response to said trip actuator being manually actuated, said trip operation being independent of said circuit interrupting portion operation.

16. The circuit breaker according to claim 15, wherein said trip actuator comprises a pushbutton.

17. The circuit breaker according to claim 15, wherein said trip operation mechanically causes electrical discontinuity along said conductive path.

18. The circuit breaker according to claim 17, wherein said trip portion further comprises a trip arm coupled to said trip actuator that mechanically causes said electrical discontinuity along said conductive path.

19. The circuit breaker according to claim 11, wherein said circuit interrupting portion includes sensing circuitry used to sense the occurrence of a ground fault and electromechanical linkage responsive to said sensing circuitry and used to cause said electrical discontinuity.

20. The circuit breaker according to claim 19, wherein said reset portion comprises:
   a manually operated actuator operatively coupled to said reset lockout; and
   a reset enable switch assembly electrically connected to said sensing circuitry, which is capable of being activated by operation of said actuator, such that actuation of said reset enable switch assembly simulates a ground fault in said sensing circuitry so as to activate said circuit interrupting portion.

21. The circuit breaker according to claim 20, wherein said reset enable switch assembly comprises a fixed contact that is energized by said operation of said actuator to simulate the ground fault.

22. The circuit breaker according to claim 20, wherein said reset enable switch assembly comprises a pair of momentary switches which when actuated switch power supplied to said sensing circuitry from said load phase connection to said line phase connection, and simulate the ground fault.

23. The circuit breaker according to claim 20, wherein said reset enable switch assembly comprises a plurality of switch contacts that are sequentially activated to first switch power supplied to said sensing circuitry from said load phase connection to said line phase connection, and second to simulate the ground fault.

24. A GFCI circuit breaker comprising:
   a housing;
   a pair of input conductors, one of said pair being a phase conductor and the other being a neutral conductor, said conductors being disposed within said housing and terminating through an exterior surface of said housing;
   a pair of output conductors, one of said pair being a phase conductor and the other being a neutral conductor, said conductors being disposed within said housing and terminating through an exterior surface of said housing, wherein said input phase conductor is connectable to said output phase conductor such that electrical continuity exists between said input and output phase conductors;
   a circuit interrupting portion disposed within said housing and configured to break the continuity between said input phase conductor and said output phase conductor upon the occurrence of a ground fault;
   a reset portion which, upon activation, activates the circuit interrupting portion, and configured to make electrical continuity between said input phase conductor and said output phase conductor after a ground fault occurs; and
   a reset lockout, responsive to activation of the circuit interrupting portion, for preventing the making of electrical continuity between said input phase conductor and said output phase conductor if a predetermined condition exists.

25. The GFCI circuit breaker according to claim 24, further comprising a trip mechanism disposed at least partially within said housing and configured to break the continuity between said input phase conductor and said output phase conductor independently of said circuit interrupting portion operation.

26. The GFCI circuit breaker according to claim 25, wherein said trip mechanism comprises a trip actuator accessible from said exterior surface of said housing and a trip arm extending from said trip actuator, said trip arm being configured to facilitate mechanical breaking of electrical continuity between said input phase conductor and said output phase conductor upon actuation of said trip actuator.

27. The GFCI circuit breaker according to claim 26, wherein said trip actuator comprises a pushbutton.

28. The GFCI circuit breaker according to claim 24, wherein said predetermined condition includes said circuit interrupting portion being non-operational or an open neutral condition.

29. An AFCI circuit breaker comprising:
   a housing;
   a pair of input conductors, one of said pair being a phase conductor and the other being a neutral conductor, said conductors being disposed within said housing and terminating through an exterior surface of said housing;
   a pair of output conductors, one of said pair being a phase conductor and the other being a neutral conductor, said conductors being disposed within said housing and terminating through an exterior surface of said housing, wherein said input phase conductor is connectable to said output phase conductor such that electrical continuity exists between said input and output phase conductors;
   a circuit interrupting portion disposed within said housing and configured to break the continuity between said input phase conductor and said output phase conductor upon the occurrence of an arc fault;
   a reset portion which, upon activation, activates the circuit interrupting portion, and configured to make electrical continuity between said input phase conductor and said output phase conductor after an arc fault occurs; and
   a reset lockout, responsive to activation of the circuit interrupting portion, for preventing the making of electrical continuity between said input phase conductor and said output phase conductor if a predetermined condition exists.

30. The AFCI circuit breaker according to claim 29, further comprising a trip mechanism disposed at least partially within said housing and configured to break the continuity between said input phase conductor and said output phase conductor independently of said circuit interrupting portion operation.

31. The AFCI circuit breaker according to claim 30, wherein said trip mechanism comprises a trip actuator accessible from said exterior surface of said housing and a trip arm extending from said trip actuator, said trip arm being configured to facilitate mechanical breaking of electrical continuity between said input phase conductor and said output phase conductor upon actuation of said trip actuator.

32. The AFCI circuit breaker according to claim 31, wherein said trip actuator comprises a pushbutton.

33. The AFCI circuit breaker according to claim 29, wherein said predetermined condition includes said circuit interrupting portion being non-operational or an open neutral condition.

34. A circuit breaker comprising:
- a housing having a line phase connection and load phase connection accessible from an exterior of said housing;
- a conductive path within said housing between said line and load phase connections;
- a circuit interrupting portion disposed within said housing and configured to open said conductive path upon the occurrence of at least one of a plurality of predefined conditions;
- a reset portion having an actuator extending through said exterior of said housing, wherein activation of the reset portion activates the circuit interrupting portion, and configured to close said conductive path upon actuation of said actuator; and
- a reset lockout portion, responsive to activation of the circuit interrupting portion, for preventing the closing of said conductive path if a second predefined condition exists.

35. The circuit breaker according to claim 34, wherein said plurality of predefined conditions include ground faults, arc faults, immersion detection faults, appliance leakage faults and equipment leakage faults.

36. The circuit breaker according to claim 34, wherein said second predefined condition includes said circuit interrupting portion being non-operational or an open neutral condition.

37. The circuit breaker according to claim 34, further comprising a trip portion disposed at least partially within said housing and configured to open said conductive path independently of said circuit interrupting portion operation.

38. The circuit breaker according to claim 37, wherein said trip portion comprises a trip actuator accessible from said exterior of said housing and a trip arm coupled to said trip actuator, said trip arm being configured to facilitate mechanical breaking of said conductive path if said trip actuator is actuated.

39. The circuit breaker according to claim 38, wherein said trip actuator comprises a pushbutton.

40. The circuit breaker according to claim 34, wherein said conductive path includes a pair of contacts wherein at least one of said pair of contacts is movable relative to the other such that said contacts can be moved between open and closed positions.

41. The circuit breaker according to claim 40, wherein said circuit interrupting portion includes sensing circuitry used to sense the occurrence of said plurality of predefined conditions and electro-mechanical linkage responsive to said sensing circuitry and used to cause said pair of contacts to open.

42. The circuit breaker according to claim 34, wherein said circuit interrupting portion comprises sensing circuitry used to sense the occurrence of said plurality of predefined conditions; and wherein said reset portion comprises a fault simulator electrically connected to said sensing circuitry and capable of being activated by said actuator, such that activation of said fault simulator simulates one or more of said plurality of predefined conditions causing said sensing circuitry to sense the occurrence of said one or more of said plurality of predefined conditions.

43. The circuit breaker according to claim 42, wherein said plurality of predefined conditions includes ground faults, arc faults, immersion detection faults, appliance leakage faults and equipment leakage faults.

44. The circuit breaker according to claim 43, wherein said one or more of said plurality of predefined conditions comprise a ground fault and an arc fault.

45. The circuit breaker according to claim 43, wherein said one or more of said plurality of predefined conditions comprise a ground fault.

46. The circuit breaker according to claim 43, wherein said one or more of said plurality of predefined conditions comprise an arc fault.

47. The circuit breaker according to claim 34, wherein said housing is configured and dimensioned for installation in a circuit breaker panel.

* * * * *

UNITED STATES PATENT AND TRADEMARK OFFICE
Certificate

Patent No. 6,717,782 B2                                        Patented: April 6, 2004

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Andrey N. Putilin, Moscow, Russia; and Andrew A. Lukyanitsa, Moscow, Russia.

Signed and Sealed this Fifth Day of September 2006.

DIANE LEE
*Supervisory Patent Examiner*
Art Unit 2851

UNITED STATES PATENT AND TRADEMARK OFFICE
CERTIFICATE OF CORRECTION

PATENT NO. : 6,717,782 B2  
APPLICATION NO. : 09/950733  
DATED : April 6, 2004  
INVENTOR(S) : DiSalvo et al.

It is certified that error appears in the above-identified patent and that said Letters Patent is hereby corrected as shown below:

In the Drawings:

Sheet 15 of 32, replace "209" with --309--;

Sheet 20 of 32, add a line connecting the right-most contact of switch 276 to line U6.

Signed and Sealed this

Second Day of October, 2007

JON W. DUDAS  
*Director of the United States Patent and Trademark Office*